US012566068B2

(12) United States Patent
Tophøj et al.

(10) Patent No.: US 12,566,068 B2
(45) Date of Patent: Mar. 3, 2026

(54) DETERMINING VEHICLE ROUTE MAPS AND ROUTES

(71) Applicant: A.P. Møller - Mærsk A/S, Copenhagen (DK)

(72) Inventors: Troels Tophøj, Copenhagen (DK); Olga Henneberg, Copenhagen (DK); Rune Viuff Petersen, Copenhagen (DK); Simon Engelhardt, Copenhagen (DK); Johan Kjaergaard, Copenhagen (DK); Anders Rydbirk, Copenhagen (DK); Camilla Jensen, Copenhagen (DK); Daniel Nilsson, Copenhagen (DK)

(73) Assignee: A.P. MØLLER—MÆRSK A/S, Copenhagen K (DK)

( * ) Notice: Subject to any disclaimer, the term of this patent is extended or adjusted under 35 U.S.C. 154(b) by 100 days.

(21) Appl. No.: 18/537,326

(22) Filed: Dec. 12, 2023

(65) Prior Publication Data

US 2024/0118088 A1     Apr. 11, 2024

Related U.S. Application Data

(63) Continuation of application No. PCT/EP2022/066659, filed on Jun. 20, 2022.

(30) Foreign Application Priority Data

Jun. 22, 2021     (DK) .............................. PA202100673

(51) Int. Cl.
G01C 21/20          (2006.01)
G01C 21/00          (2006.01)
(52) U.S. Cl.
CPC ........... G01C 21/203 (2013.01); G01C 21/00 (2013.01); G01C 21/3826 (2020.08); G01C 21/3841 (2020.08); G01C 21/3863 (2020.08)

(58) Field of Classification Search
CPC ............ G01C 21/3492; G01C 21/3415; G01C 21/3461; G01C 21/3841; G01C 21/3617; G01C 21/3863
See application file for complete search history.

(56) References Cited

U.S. PATENT DOCUMENTS

2012/0158299 A1     6/2012   Cerecke et al.
2019/0178649 A1     6/2019   Lucas et al.
(Continued)

FOREIGN PATENT DOCUMENTS

EP          3496070 A1       6/2019
WO      2019046828 A1       3/2019

OTHER PUBLICATIONS

Zissis et al: A distributed spatial method for modeling maritime routes, IEEE Access, IEEE, USA, vol. 8, Mar. 9, 2020.
(Continued)

*Primary Examiner* — Mike Anderson
(74) *Attorney, Agent, or Firm* — Fish & Richardson P.C.

(57)          ABSTRACT

A method and system for determining a route map and a route for a vehicle. Generating the route map comprises obtaining historical data comprising a plurality of data points for each of a plurality of vehicles from storage and determining a plurality of nodes each representing a subset of the data points. The historical data is applied to the plurality of nodes to determine the closest node for each vehicle. The nodes are ordered for each of the plurality of vehicles in the historical data by time; and a directed edge is generated between a first and second node of the plurality of ordered nodes, based on when the historical data indicates that a given vehicle has transited from the first node and the second node. A route is determined for the vehicle based on the generated route map and outputted route to a control system.

10 Claims, 11 Drawing Sheets

(56)                 References Cited

U.S. PATENT DOCUMENTS

| | | | |
|---|---|---|---|
| 2019/0204100 A1 | 7/2019 | Sharma | |
| 2019/0346275 A1* | 11/2019 | Kelly | G01C 21/3415 |
| 2020/0080854 A1 | 3/2020 | Fu et al. | |
| 2020/0377128 A1* | 12/2020 | Marczuk | G08G 1/096816 |
| 2022/0019220 A1* | 1/2022 | Yang | H04W 4/44 |
| 2022/0373339 A1* | 11/2022 | Xu | G06Q 50/40 |

OTHER PUBLICATIONS

International Search Report and Written Opinion dated Oct. 7, 2022 for PCT Application No. PCT/EP2022/066659.
Denmark Search Report dated Jan. 21, 2022 for DK Application No. PA202100673.

\* cited by examiner

A: {21-01-12, 04:32; {sunny; 15mph; 52%; no congestion}}

B: {21-01-14, 19:27; {light rain; 21mph; 67%; medium congestion}}

C: {21-01-21, 14:19; {heavy rain; 57mph; 82%; heavy congestion}}

DETERMINING VEHICLE ROUTE MAPS AND ROUTES

CROSS-REFERENCE TO RELATED APPLICATIONS

This application is a continuation under 35 U.S.C. § 120 of International Application No. PCT/EP2022/066659, filed Jun. 20, 2022 which claims priority to Denmark Application No. PA202100673, filed Jun. 22, 2021, under 35 U.S.C. § 119(a). Each of the above-referenced patent applications is incorporated by reference in its entirety.

TECHNICAL FIELD

The present invention relates to a method, system, and computer-readable medium for determining a route for a vehicle.

BACKGROUND

In transportation and logistics, determining optimal routes and estimating the arrival time of a vehicle is both time-intensive and costly to undertake. The automation of these determination has been met with a number of complications due to the number of factors to be considered when determining a route and corresponding estimate for the time of arrival.

Factors such as adverse weather conditions, congestion, and delays in accessing resources can all contribute to changes in a determined route and an estimated time of arrival. Furthermore, changes in each of those conditions throughout a journey can result in further calculations being required to determine an alternative route, and/or a more accurate estimation for the arrival time of the vehicle.

Undertaking this task for a large fleet of vehicles is time-consuming, and costly, and whilst efforts have been made to attempt to automate some aspects of this process they are particularly resource-intensive and computationally complex. Therefore, it is desirable to reduce the computational complexity and resource requirements for determining the alternative routes and/or estimations for the time of arrival for a given vehicle or fleet of vehicles.

SUMMARY

According to a first aspect of the present invention, there is provided a method for determining a route for a vehicle, the method comprising the steps of generating a route map, wherein the generation of the route map comprises: obtaining historical data for a plurality of vehicles from a storage, the historical data comprising a plurality of data points for each of the plurality of vehicles; determining a plurality of nodes each representing a subset of the data points of the historical data; applying the historical data to the plurality of nodes to determine a closest node for each vehicle; ordering the nodes for each of the plurality of vehicles in the historical data by time; generating a directed edge between a first node of the plurality of nodes and a second node of the plurality of ordered nodes, when the historical data for a given vehicle indicates that the given vehicle has transited from the first node and the second node; determining the route for the vehicle based on the generated route map; and outputting the determined route to a control system. This enables accurate route maps to be generated efficiently using minimal resources based on large amounts of historical data whilst also considering a number of other factors such as vehicle characteristics. The efficient generation of routes from the route maps also enables autonomous vehicle components such as an autopilot system to be updated and facilitate the navigation of the vehicle along the route. Since the routes are transmitted to the control system by efficiently processing the data and generating the route and route maps, there is a more efficient use of resources especially when transmitting the route and/or route maps over a network as such the network requirements are reduced.

Optionally, the method further comprises the step of refining the route map based on at least one of a density of the plurality of nodes and one or more obstacles. This enables edges in the route map to be filtered based on the likelihood that a previous vehicle actually transited across the edge, thereby simplifying the route map further and enabling a more efficient generation of a route. For example, where the vehicle is an ocean-going vessel, this enables edges that cross a land mass to be removed from the route map.

Refining the route map based on the density of the plurality of nodes may comprise determining a first group of vehicles where the first node is the closest node; determining a second group of vehicles where the second node is the closest node; calculating a first average distance from each of the first group of vehicles to the first node and a second average distance from each of the second group of vehicles to the second node; determining a threshold length of the directed edge based on the first average distance and second average distance calculated, and filtering the edges based on the threshold length. This ensures that the route map is filtered based on the distances of the historical data to the nodes thereby further simplifying the route map and enabling more efficient searching of the route map when generating the route.

Refining the route map based on one or more obstacles may also comprise obtaining geographical information representing at least an obstacle in a given area; identifying whether one or more edges of the route map intersect the obstacle; determining whether to delete one or more of the identified edges, and refining the route map based on the determination. This also ensures that the route map is filtered based on the distances to the nodes thereby further simplifying the route map and enabling more efficient searching of the route map when generating the route.

Optionally, determining whether to delete one or more of the identified edges comprises sorting the identified edges based on the length of each edge; determining an alternative route via nodes in the route map from a start node of the identified edge to an end node of the identified edge; calculating a distance of the alternative route; determining if the distance of the alternative route exceeds a threshold, and deleting the edge from the route map if the distance of the alternative route exceeds the threshold. This ensures that there is an alternative route of reasonable length for a vehicle to take, and minimizes the chance of deleting a valid edge from the route map.

The threshold may be a multiple of the length of the identified edge, ensuring that the identified edges are of a given length and that the valid edges are not deleted if there is an alternative valid route.

Optionally, the step of determining the route for the vehicle comprises: categorizing the vehicle based on at least a size characteristic of the vehicle; obtaining a current location of the vehicle; determining a start node in the route map that is closest to the current location of the vehicle; determining an end node in the route map that is closest to a destination of the vehicle; performing a search on the route map to determine the route corresponding to the shortest distance between the start node and the end node wherein the start node and the end node comprises a type corresponding to the size characteristic of the vehicle, and replacing the start node of the with the current location of the vehicle, and the end node with the destination of the vehicle. This ensures that any routes start at the current location of the vehicle and end at the actual destination rather than the location of the nodes.

Determining the plurality of nodes may comprise applying a k-means clustering algorithm to the historical data. This enables the number of nodes to be distributed based on the density of the historical data, thereby simplifying the route map and enabling more efficient processing and searching when generating the route.

The historical data may represent at least the vehicle size, location data, time data, and subsequent node data. This ensures that the route map generated can be filtered based on vehicle characteristics, and the nodes sorted based on the location, and ordered such that edges may be provided between two nodes.

Optionally, the route map is used to determine an estimated time of arrival by providing at least the determined route as an input to a trained machine learning algorithm. This enables accurate calculation of the estimated time of arrival based on the route.

The method may further comprise analysing the determined route at the vehicle, and navigating the vehicle along the determined route, this enables the vehicle to follow the updated route and adjust the route if the route changes during the journey.

According to a second aspect of the present invention, there is provided a system for generating a route for a vehicle, the system comprising: storage for storing historical data for a plurality of vehicles, the historical data comprising a plurality of data points for each of the plurality of vehicles; at least one processor for generating a route map and determine a route, the processor comprising: an input module for obtaining the historical data from storage; an analysis module for determining a plurality of nodes representing a subset of the data points of the historical data, and applying the historical data to the plurality of nodes to determine a closest node for each of the plurality of vehicles at a given time; an ordering module for ordering the nodes for each of the plurality of vehicles by time; an edge generation module for generating an edge between a first node and a second node of the plurality of ordered nodes, when the historical data for a given vehicle indicates that the given vehicle has transited from the first node to the second node; and a route determination module for determining a route for the vehicle based on the generated route map; and a control system configured to receive at least the determined route. This enables accurate route maps to be generated efficiently using minimal resources based on large amounts of historical data whilst also considering a number of other factors such as vehicle characteristics. The efficient generation of routes from the route maps also enables autonomous vehicle components such as an autopilot system to be updated and facilitate the navigation of the vehicle along the route.

Optionally, the processor further comprises a refinement module for refining the route map based on at least one of a density of the plurality of nodes and one or more obstacles. This enables edges in the route map to be filtered based on the likelihood that a previous vehicle actually transited across the edge, thereby simplifying the route map further and enabling a more efficient generation of a route. For example, where the vehicle is an ocean-going vessel, this enables edges that cross a land mass to be removed from the route map.

The refinement module may comprise a density analysis module for determining a first group of vehicles where the first node is the closest node; determining a second group of vehicles where the second node is the closest node; calculating a first average distance from each of the first group of vehicles to the first node and a second average distance from each of the second group of vehicles to the second node; determining a threshold length of the directed edge based on the first average distance and second average distance calculated, and filtering the edges based on the threshold length. This ensures that the route map is filtered based on the distances of the historical data to the nodes thereby further simplifying the route map and enabling more efficient searching of the route map when generating the route.

The refinement module may also comprise an obstacle analysis module for obtaining geographical information representing at least one obstacle in a given area; identifying whether one or more edges of the route map intersect the obstacle; determining whether to delete one or more of the identified edges, and refining the route map based on the determination. This also ensures that the route map is filtered based on the distances to the nodes thereby further simplifying the route map and enabling more efficient searching of the route map when generating the route.

Optionally, the system also comprises a machine learning processor for determining an estimated time of arrival using a trained machine learning algorithm based on the route. This enables accurate calculation of the estimated time of arrival based on the route.

According to a third aspect of the present invention, there is provided a computer-readable storage medium, storing instructions that, when executed by a processor, cause the processor to determine a route for a vehicle, the instructions comprising generating a route map, wherein the generation of the route map comprises obtaining historical data for a plurality of vehicles from a storage, the historical data comprising plurality of data points for each of the plurality of vehicles; determining a plurality of nodes representing a subset of the data points of the historical data; applying the historical data to the plurality of nodes to determine a closest node for each vehicle at a given time; ordering the nodes for each of the plurality of vehicles in the historical data by time; generating a directed edge between a first node of the plurality of nodes and a second node of the plurality of ordered nodes, when the historical data for a given vehicle indicates that the given vehicle has transited from the first node and the second node; determining the route for the vehicle based on the generated route map; and outputting the determined route to a control system. This enables accurate route maps to be generated efficiently using minimal resources based on large amounts of historical data whilst also considering a number of other factors such as vehicle characteristics. The efficient generation of routes from the route maps also enables autonomous vehicle components such as an autopilot system to be updated and facilitate the navigation of the vehicle along the route.

BRIEF DESCRIPTION OF DRAWINGS

Embodiments of the invention will now be described, by way of example only, with reference to the accompanying drawings, in which.

DETAILED DESCRIPTION

Accurately determining a route and an estimated time of arrival for a vehicle, such as an ocean-going vessel, aircraft, or motor vehicle, is a complex and time-consuming process, especially when events occur during transit between a start point and a destination. For example, weather conditions can have a large impact on the route chosen and the estimated time of arrival, especially for vehicles such as ships and aircraft. Being able to quickly and efficiently react to such changes is essential for ensuring smooth passage along a route, and being able to provide accurate arrival times.

With the advance of automated systems, such as autopilot, and/or autonomous controls for ships and motor vehicles, accurate route planning which can compensate for real-world environmental changes, such as the weather or increased congestion is increasingly important. Enabling the analysis of such environmental changes and compensating for those changes in the route selected and the estimated time of arrival is particularly important when dealing with such vehicles. Allowing those vehicles to intuitively and intelligently update central control systems or enabling a central control system to provide an update to the vehicles, thereby enabling quick and efficient passage across a route. Similarly, providing that information to a control system can also assist in the reprogramming of such automated systems, increasing the efficiency of the transit between an originating location and a destination. In some examples, the control system may comprise a display for indicating a user, such as an operator of the vehicle, and/or the control system may comprise further processors or processing capabilities to automatically adjust and/or alter the route of the vehicle. Furthermore, in the logistics industry, such updates enable clients and customers to be kept up to date with the estimated arrival time for a consignment. As such, on the adjustment of the route of the vehicle by the control system, the control system may make notifications to one or more customers as to the updated time of arrival.

There are several aspects to the system for determining routes for vehicles and for determining an estimated time of arrival based on those routes. In many examples, machine learning methods and apparatus are used to quickly and efficiently analyse a large amount of information, and provide an accurate output for the control systems of the vehicles to further process.

Machine Learning Model

Figure 1:
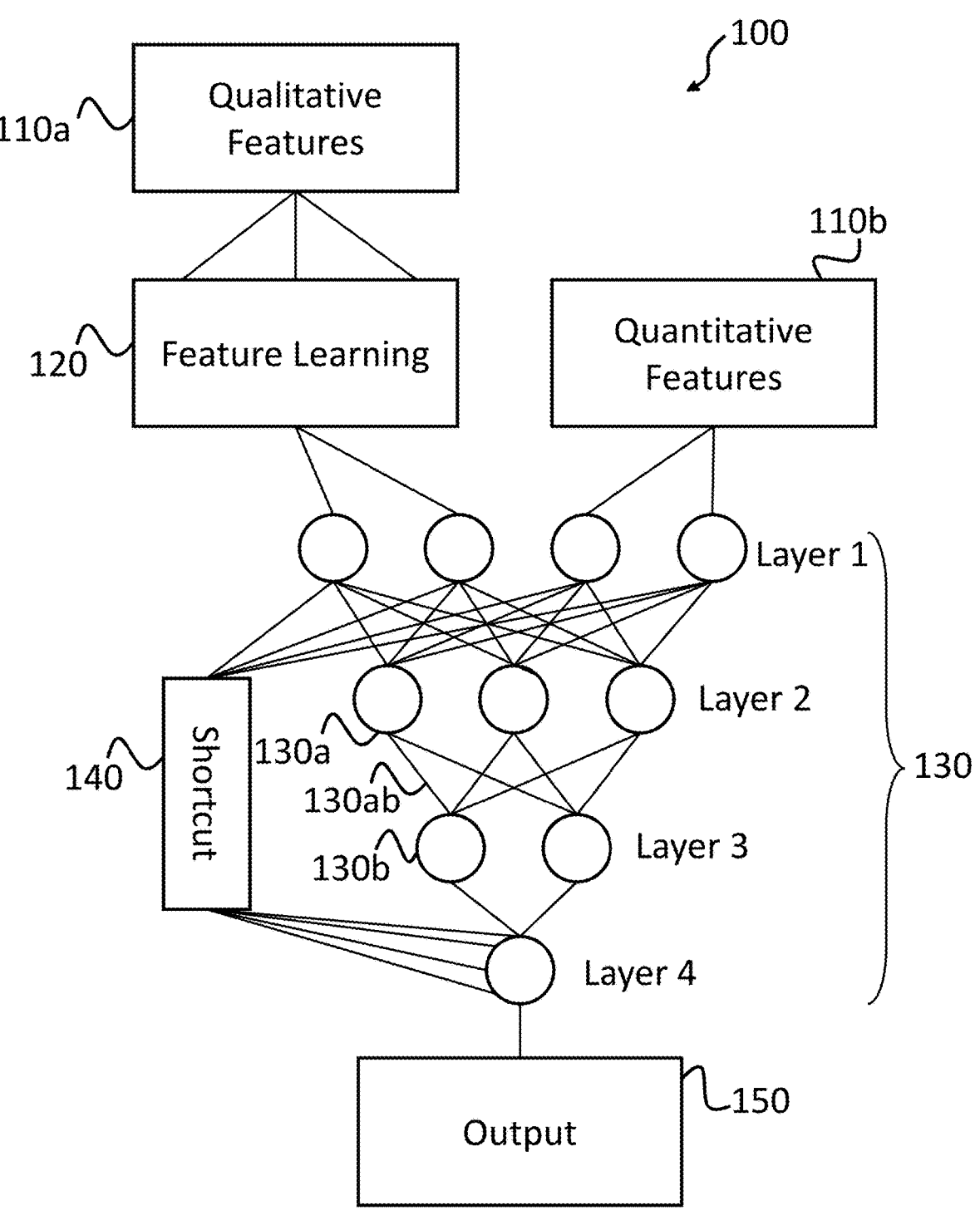
FIG. 1 is a schematic representation of a machine learning architecture representing a neural network according to an example.

FIG. 1 shows an example of a machine learning model 100 which may be used to determine an updated estimate for a time of arrival for a vehicle at a destination, based on a route as well as other factors.

The machine learning method 100 is a neural network, configured to receive a number of inputs 110*a*, 110*b*, analyse them and produce an output 150. The analysis of the inputs is undertaken in many fully connected layers, however, it will be appreciated that in some examples, other types of neural network, such as a deep sequence model may be used, and the methodologies discussed below are not limited to using a particular type of neural network.

The machine learning method 100 comprises a plurality of layers 130, each configured to receive at least one input, either directly or from a preceding layer, and process it such that an output is produced. The output may then be provided to a subsequent layer, such as between Layer 1 and Layer 2, or as an output 150 to the machine learning model 100. Each of the layers 130 comprises at least one neuron 130*a*, 130*b*, which is configured to process at least one input and generate an output. Neurons 130*a*, 130*b* are often aggregated into layers based on the different operations on their inputs that they undertake. Outputs are then transmitted to other neurons 130*a*, 130*b* along connections 130*ab*. In some examples, each neuron 130*a*, 130*b* only transmits a signal along the connection 130*ab* to another neuron 130*a*, 130*b* if a threshold is met.

Neural networks, such as the machine learning model 100 of FIG. 1, are trained on training data which is arranged to refine the processing undertaken at leach neuron 130*a*, 130*b*. During the training process weights associated with each neuron 130*a*, 130*b* and connection 130*ab* are adjusted such that the strength of the connection is increased or decreased, thereby affecting whether the signal is transmitted along the connection 130*ab* to other neurons 130*a*, 130*b* based on the inputs 110*a*, 110*b* provided. Each layer may be traversed a number of times depending on the weighting and to ensure the most accurate overall output 150.

In some examples, the machine learning model 100 may comprise a shortcut 140, sometimes called a residual neural network which facilitates the skipping of layers, thereby simplifying the learning process, speeding up the learning and reducing the possibility of encountering a vanishing gradient. This can be achieved by grouping inputs 110*a*, 110*b* that are strongly linearly correlated with the output. For example, there is a strong correlation between the length of a route and the time required to transit that route.

The machine learning model 100 of FIG. 1, is arranged to receive a number of different inputs 110*a*, 110*b*. The inputs may include data such as the vehicle features (i.e. length, manufacture data, type), current time information (i.e. the day, month, year), journey features (i.e. the start location, destination, previous destinations, distance remaining, predicted route, average time for other vehicles to take that route), as well as other calculated information such as a scheduled arrival time or a previous estimate. Furthermore, in some examples, data may be obtained from one or more other sources. One such example is when the vehicle is an ocean-going vessel, inputs may be obtained from the Automatic Identification System ('AIS'), which uses transceivers on the vessels to obtain current locations and vessel information, similar to the transponder system used by aircraft. The AIS data includes information such as the vessel's current location, speed, weight, heading, draught, among other features.

The inputs 110a, 110b may be categorized as qualitative inputs 110a, or quantitative inputs 110b. Examples, of qualitative inputs 110a include, the destination, the vehicle type, and the data, whereas quantitative inputs 110b include the latitude/longitude and the vehicle speed.

To improve training times, the qualitative inputs 110a may undergo pre-processing via feature learning 120. This enables some aspect of the training to be undertaken on those features before the main training of the machine learning model 120. By undertaking this pre-processing, the qualitative inputs 110a may be processed to quantify and categorize similarities between such qualitative inputs 110a. This thereby speeds up the training of the main machine learning model 100.

The output 150 may comprise more than one piece of information for use in the concepts described below. For example, when determining an estimated time of arrival, the output 150 may comprise both the estimated time of arrival prediction and a confidence estimate. The confidence estimate portion of the output 150 may utilize a Bayesian dropout over several predictions to determine a probability distribution and thereby indicate whether a given prediction is likely to be more accurate than another prediction. Similarly, previous predictions may be used to indicate an average prediction error to indicate whether a particular output based on a given input is more or less likely to be correct, or within a given allowable range. Therefore, if new criteria/information are provided to the machine learning model 100 the output can indicate whether this is likely to increase or decrease the confidence in the output 150. This additional confidence level can be provided to a control system and analysed alongside the main output to determine whether a given action should be taken based on this information. For example, where the confidence output indicates that the confidence is low, further predictions and/or analysis may be undertaken before the control system indicates a particular action given the uncertainty in the output 150. In one example, before the action is taken a further analysis may be undertaken, such as at a later time during the vehicle's transit which may result in a more accurate output and therefore higher confidence. Conversely, where the confidence output indicates the confidence is high, the control system may perform the particular action as the model indicates that the output 150 is likely very accurate.

The machine learning model 100 may be implemented as part of the invention described below in relation to FIGS. 7 to 15, although it will be appreciated that the machine learning model may be implemented in relation to any number of other inventions whereby it is necessary to obtain an estimated time of arrival or any other estimated time based on a number of inputs. Similarly, whilst the example shown in FIG. 1 has four layers, it will be understood that the machine learning model may have any number of layers. Determining a Route Map and Route Determining a route for a vehicle between two points, an origin and a destination, is a complex task and dependent upon a number of inputs. For example, the type of vehicle, the size of the vehicle, and congestion in and around the potential routes can all affect the most optimal route. Whilst the examples described below relate to the determination of a route for a vessel, such as a ship, it will be appreciated that the method and system described may be utilised for determining the routes for any type of vehicle, such as a car, delivery truck, or aircraft.

Determining an optimal route for a vehicle is not always a simple task due to the nature of the available route, for example, sea lanes for ships. The direct great-circle distance, which accounts for the curvature of the Earth over long distances is not always applicable, and simply dividing the Earth into a grid does not scale due to the different high- and low-density areas. That is large numbers of grid points are generated for areas of the Earth where the vehicle would never travel, such as the Arctic and a large portion of the Pacific Ocean, or in the case of a ship, over land.

Figure 2:
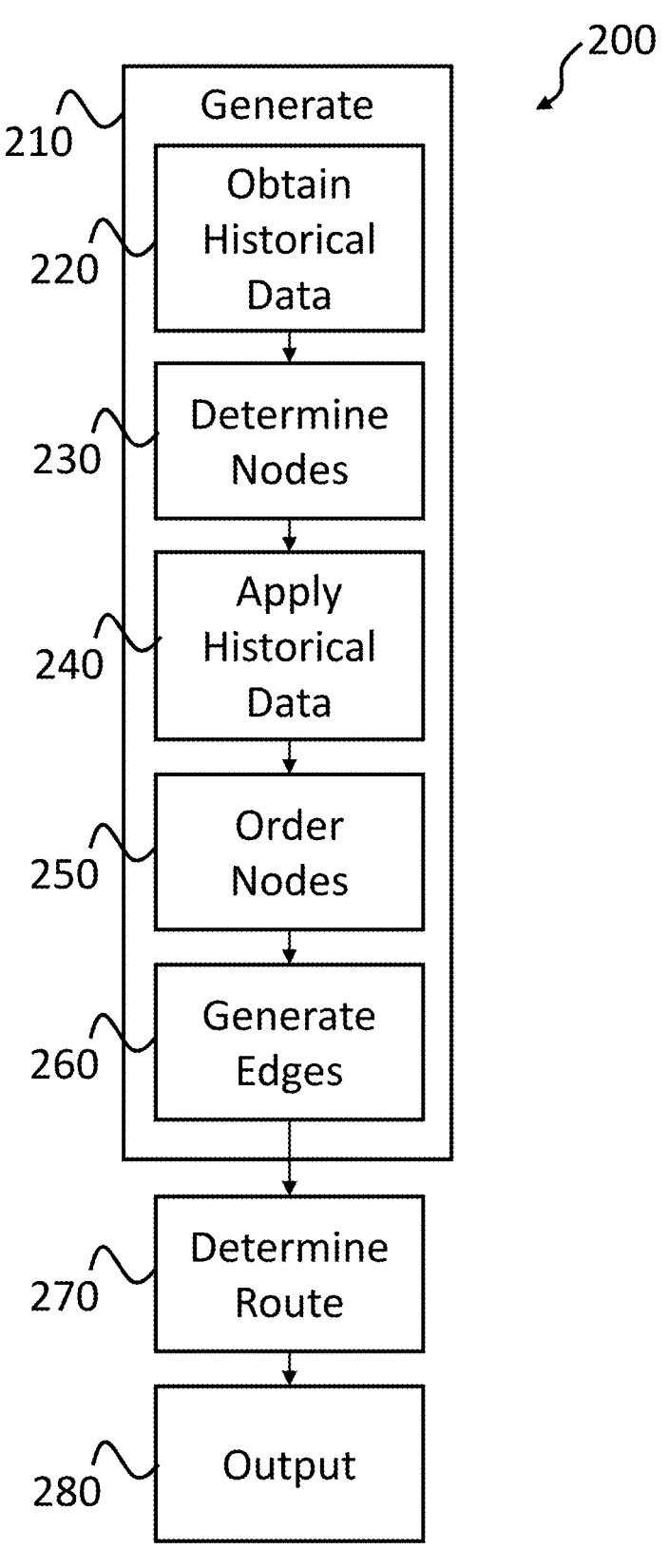
FIG. 2 is a flowchart showing a method for determining a route for a vehicle according to an example.

FIG. 2 shows a method 200 for determining a route for a vehicle such as a ship, which overcomes the issues mentioned above. Method 200 comprises the generation 210 of a route map. The generation 210 of the route map comprises a number of steps 220, 230, 240, 250, 260. These steps enable the generation of a route map that can be traversed efficiently and with minimal processing power to determine a route for a vehicle. To generate the graph at step 220, historical information is obtained from an external or internal data source. The historical information will depend on the vehicle type, for example, where the vehicle is a ship the historical data may be data obtained from the Automatic Identification System ('AIS'), although it will be understood that different historical data will be obtained for different vehicle types. The AIS data comprises a plurality of points of data indicating the location and characteristics of a vessel at a given time over a specific period. For example, as an input, method 200 may obtain at step 220 AIS data for up to the past four, five or six years. It will be appreciated that the time period over which the data is obtained may vary based on the implementation as well as the data available from the data source.

Figure 3:
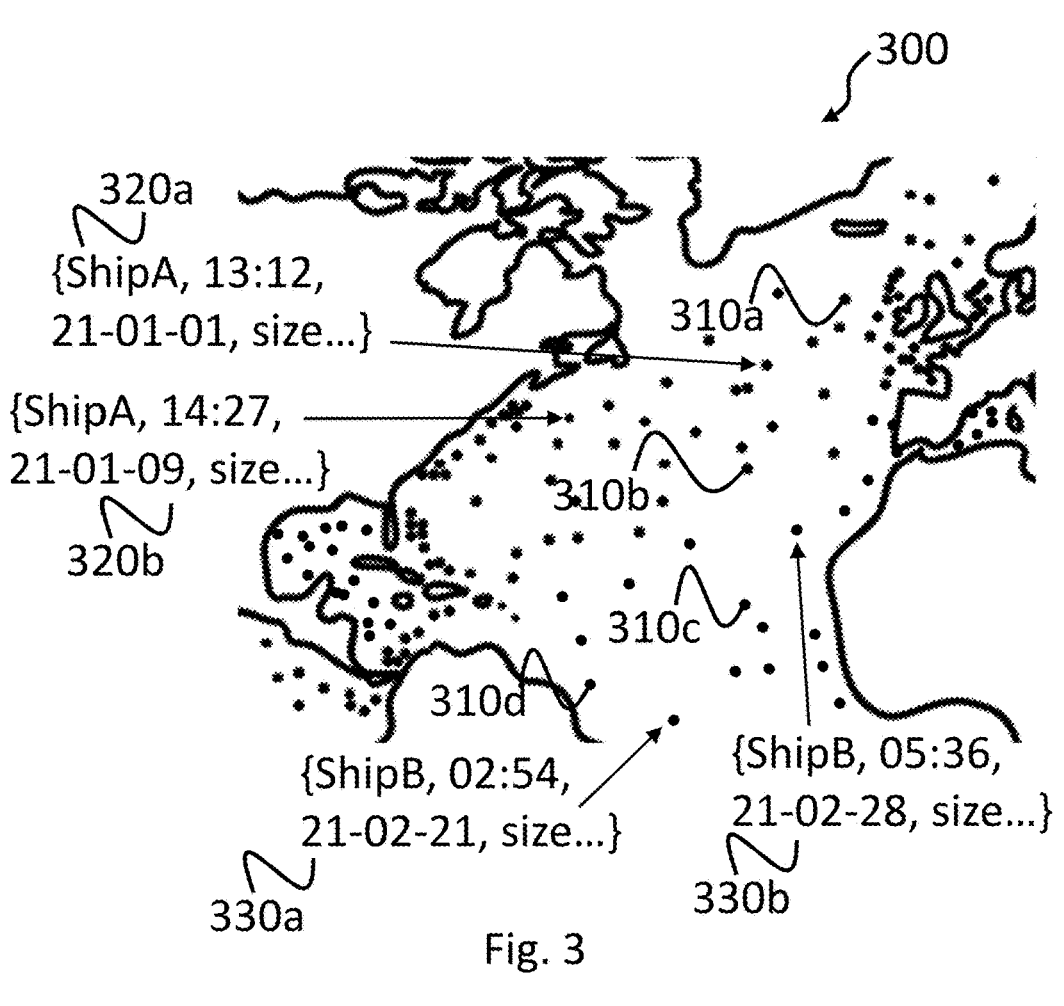
FIG. 3 is a representation of the historical data according to an example.

FIG. 3 shows a representation 300 of AIS data obtained in such an example for the Atlantic Ocean. The AIS data comprises a plurality of points 310a, 310b, 310c, 310d which each represent ship locations at a given time. For example, a first ship, ShipA has at least two data points within the AIS data. The first data point 320a indicates the location of ShipA at 13:12 on 1 Jan. 2021, along with at least a size characteristic. The second data point 320a indicates the location of ShipA at 14:27 on 9 Jan. 2021. Similarly, a second ship ShipB also has at least two data points within the AIS data, the first data point 330a indicates the location of the ShipB at 02:54 on 21 Feb. 2021 along with at least a size characteristic. The second data point indicates the location of ShipB at 05:36 on 28 Feb. 2021. It will be appreciated that there may be other data points representing the locations of ShipA and ShipB within the data set between the two data points selected. Each data point may also include other attributes such as the heading, width, length, draught, gross tonnage, and current destination.

In some examples, the size characteristic associated with each data point may be used to group the data points for filtering. For example, where the vessel a route is being determined for is above a given size, and is classed as a NeoPanamax ship, then the data points which include vessels capable of transiting the Panama Canal may be excluded since they cannot be used to determine a route for the vessel since it is too large to fit through the Panama Canal.

Returning to method 200, once the historical data has been obtained at step 220, a number of nodes are then determined 230 based on the historical data. Since there is a large number of historical data points, often in the range of hundreds of millions, it is desirable to extract a more generic representation of where vehicles are directed. For example, when using AIS data, it is desirable to determine where vessels usually sail on the ocean, and to vary the density, as more accurate information is required closer to the shore than in the middle of the ocean. This can assist in ensuring that a more accurate and efficient data set is used when generating the route map.

There are many methods for filtering and/or reducing the data set into a number of nodes. For example, a K-means clustering algorithm may be applied to the historical data, where K is set to the number of nodes required. In some examples, K may be set to 50,000 to provide a sufficient number of nodes whilst enabling efficient processing. It will be appreciated that other methods of clustering the nodes may be used such as a distribution or density-based clustering method.

Figure 4:
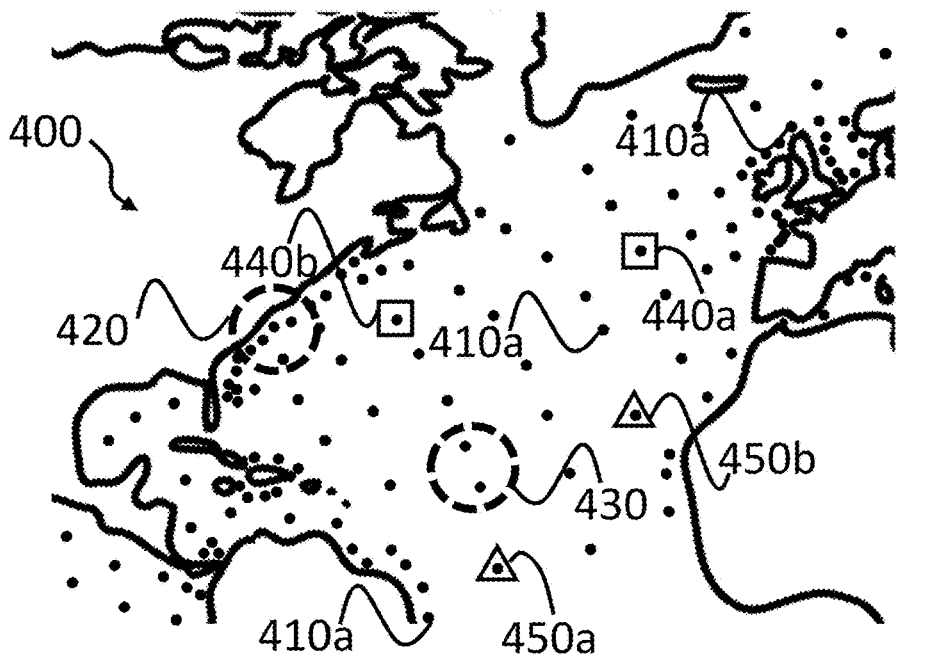
FIG. 4 is a representation of the historical data applied to a plurality of nodes according to an example.

FIG. 4 shows a representation 400 of the nodes 410*a*, 410*b*, 410*c* determined in step 230 for ocean-going vessels based on AIS data. The nodes 410*a*, 410*b*, 410*c* are distributed across the area based on the density of the data points in the AIS data. For example, the nodes for areas nearby a coastline such as those indicated in group 420 are much closer together than the nodes in the middle of the ocean such as those indicated in group 430.

Returning to FIG. 2, following the determination of the nodes based on the historical data, the historical data is analysed and applied to the nodes at step 240. Applying the historical data to the nodes comprises determining the closest node to each of the data points of the historical data. Based on the previously described examples set out in relation to FIGS. 3 and 4, data point 320*a* related to ShipA, would be allocated to node 440*a*, and data point 320*b* related to ShipA would be allocated to node 440*b*. Similarly, data point 330*a* related to ShipB would be allocated to node 450*a* and data point 330*b* related to ShipB would be allocated to node 450*b*. As such it will be understood that a number of data points will be allocated to the same node.

Following the allocation of the data points of historical data to the nodes, the data points need to be further analysed to determine differences in the timestamps associated with each data point. At step 250, this enables the nodes to be ordered based on the timestamp. Within the route map which is being generated based on the historical data. Returning to the example set out in relation to FIGS. 3 and 4, the timestamps associated with the data points 320*a*, 320*b* of ShipA are ordered such that data point 320*a* is before 320*b*. Similarly, the timestamps associated with data points 330*a*, 330*b* of ShipB are ordered such that data point 330*a* is before 320*b*, this is then fed back to the nodes such that an edge can be created between the nodes 440*a*, 440*b*, 450*a*, 450*c* as appropriate in step 260. It will be appreciated that the ordering of the data points may occur before the allocation of the data points to the nodes, or in some other examples, data associated with the nodes themselves may be used during the ordering process.

Figure 5:
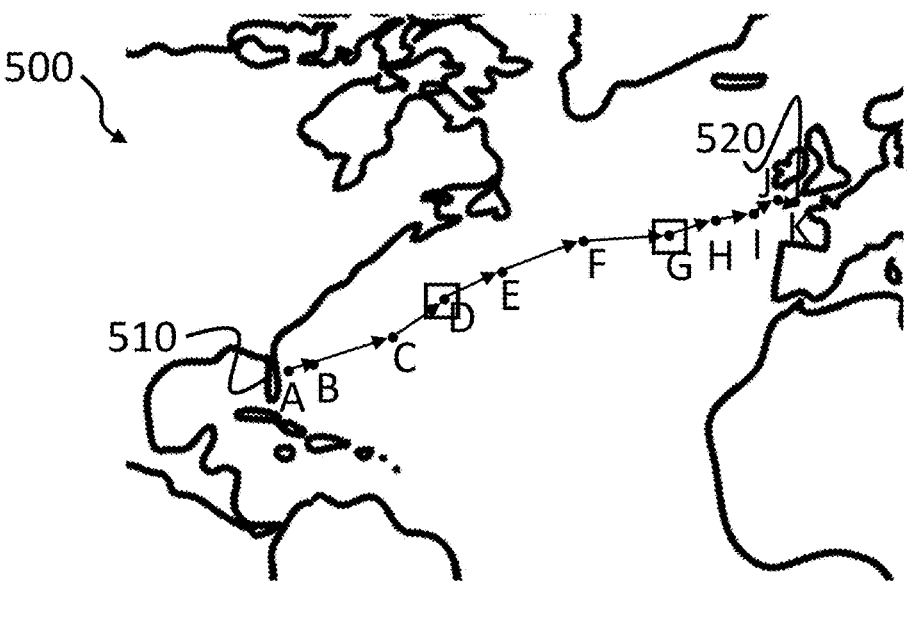
FIG. 5 is a representation of a route according to an example.

At step 260 a directed edge is created between the nodes based on a route transited by a vehicle. By ordering the data points, the directed edges between the nodes are based on the difference between the timestamp and indicate that a vehicle has transited between the two nodes. FIG. 5 shows an example of such edges for ShipA discussed previously in relation to FIGS. 3 and 4. A route for ShipA from an origin 510 to a destination 520 is shown. The nodes A-K are the nodes determined based on each of the data points of the historical data set as set out above in relation to FIG. 4, examples of corresponding nodes are shown by the square outline in FIGS. 4 and 5. The directed edges indicate that the journey ShipA has taken goes through each of those edges and is based on the timestamps of the historical data and the nodes generated.

As a result of the determination of the edges, the route map is generated and may be used to determine a possible route for a new vehicle from an origin point to a destination point. In some examples, the route map is refined before the determination of routes for new vehicles. The refinement of the route map may be based on the density of edges at a given node, the length of those edges, and one or more obstacles, such as geographical features. By refining the route map in this way, more efficient parsing of the route map is possible, thereby increasing the efficiency and reducing the processing requirements when determining a route for a new vehicle.

There are several methods for refining the route map. One such method includes reducing the number of edges based on the density of edges at the node. For each node, an average distance from the node to each of the vehicles based on the historical data is calculated. This is a proxy for the density of the node, and the lower the average distance the higher the density. This average can be used to determine a threshold for the length of an edge. One such method is to use the formula:

$$\max(x, \min(a+b) \times 5, y)) \qquad \text{(equation 1)}$$

In this example, x is a lower bound cut-off such as 80,000 metres, y is an upper bound cut-off such as 750,000 metres, a is the average distance of a first node of a given edge, and b is the average distance of a second node of the given edge. Using this method any edges which are below the lower bound cut-off are always kept within the route map, and any edges above the upper bound cut-off are removes from the route map.

Another method of simplifying and/or refining the route map is dependent on the type of vehicle. For example, certain obstacles limit the transit of ocean-going vessels, such as the coastline. Similar limitations may exist for aircraft, such as mountain ranges or no-fly zones.

To determine the edges which need to be removed from the route map based on the obstacles, data relating to the obstacles is obtained, and it is first determined whether a given edge intersects the obstacle. For example, it may be determined whether an edge of the route map intersects with the coastline. For ships, such a transition between nodes is not possible since they are unable to sail over the land. However, in some examples, it is not always appropriate to remove such edges from the route map. One such example includes areas where the edge transits through a narrow passageway, such as the Suez or Panama Canals. Removing these edges would be a mistake and not in the best interests of the route map. Therefore, each edge that intersects with an obstacle such as the coastline is flagged, and further analysis is undertaken to determine whether the edge should be removed from the route map without causing a detrimental effect.

It will be appreciated that there are a number of methods by which this may be achieved. One such method involves sorting the flagged edges by length, and then checking whether an alternative route between a start node of the edge and an end node of the edge exists by searching for a route via the remaining nodes of the route map. Searching for a route via the remaining nodes may be undertaken by a searching algorithm such as an A* search. It will be understood that other searching algorithms may be used. The length of the detour route via the other nodes of the route map is then calculated by summing the length of each edge between the detour route's nodes. Determining whether to keep or remove the flagged edge from the route map is based on the distance of the detour. If the distance exceeds a threshold, then the edge is removed from the graph. The threshold may be based on a multiple of the length of the flagged edge. This means that if there is no detour available then the edge would remain, thereby compensating for obstacles such as the Panama or Suez Canals.

Other methods may also be used to simplify the route map for a particular vehicle. Taking the example of ocean-going vessels, each vessel may be assigned to a category, such as a small vessel (between 0 and 186 metres long), a medium vessel (between 186 and 369 metres long) and a large vessel (over 369 metres long). Whilst the lengths of the vessels are given here it will be appreciated that there may be more than three categories and the lengths of the vessels of each category may be different. There may be certain known characteristics of a route that means that a given size of vehicle cannot travel along it. For example, in the case of ocean-going vessels, if a vessel is over 369 metres it cannot transit the Panama Canal, therefore any routes which involve transiting the Panama Canal can be excluded from the route map. This can be achieved by determining the longest vessel associated with each node, based on the size characteristic set out in the historical data (such as the size of 320$a$, 320$b$, 330$a$, 330$b$ of FIG. 3). This can be used to categorize each node into one of the three groups, and as such be used to filter the nodes in the route map. In some examples, if the route map is to be used for determining routes for vehicles of multiple different sizes, then this filtering step may be performed just prior to determining the route.

Once the route map has been generated, and any refinements, if necessary, have been performed, then method 200 proceeds to step 270 where a route for a given vehicle is determined. Determining a route for a given vehicle comprises searching across the route map for the shortest path by distance based on the current vehicle location and the desired destination. The search may involve using an A* searching method although it will be appreciated that any number of other searching algorithms may be used to traverse the route map and determine a route. In some examples, determining a route may comprise categorising the vehicle into a group. As mentioned above in relation to refining the route map, where the route map is used for vehicles of different sizes, an initial filtering of suitable nodes may be undertaken.

As it is unlikely that a vehicle is at a given node within the route map, determining a route may first involve obtaining a location for the vehicle, such as via a global positioning system, and determining the closest node. Similarly, the destination may not be at a node within the route map, so the destination node may be found by determining the node closest to the desired destination. The searching method used to determine the route using the route map can then find a route between the node closest to the current location of the vehicle and the node closest to the destination.

Following the determination of the route, the route is output to a control system of a vehicle. The control system may comprise a display or other processing component, such as an autopilot system enabling quick and efficient changes to the route of a vehicle. In some examples, the vehicle may have some level of autonomy and updating the determined route may result in the vehicle adjusting course to follow the updated route.

Figure 6:
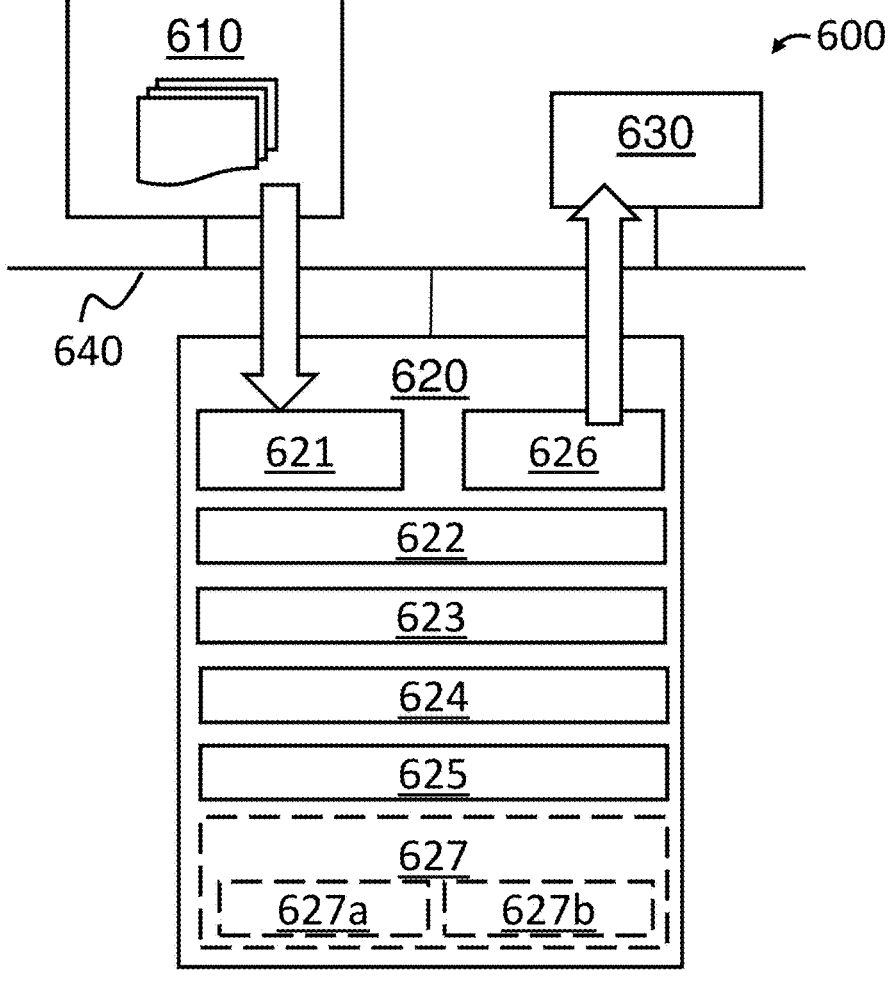
FIG. 6 is a schematic representation of a system for determining a route according to an example.

In some embodiments, method 200 may be implemented as part of a system. FIG. 6 is a schematic example of a system 600 for determining a route and outputting the route to a control system 630.

The system comprises storage 610 for storing historical data associated with a plurality of vehicles, at least one processor 620 for generating a route map and determining a route for a vehicle, and a control system 630 for receiving the determined route. The storage 610, at least one processor 620, and the control system 630 may all be interconnected with one another either as part of a single system or a remotely connected system. The interconnection may be via a system bus, or other wired or wireless connection enabling the components of the system to communicate across a network such as the Internet. For example, the storage 610 may be remote storage, such as cloud storage, or hard drives forming part of a remote server.

Storage 610 stores the historical data which may be obtained from one or more remote sources such as an AIS data source such as the historical data described above with reference to FIG. 3. The system 600 also comprises a processor 620 configured to generate a route map, and determine a route, and comprises an input module 621 configured to obtain the historical data from the storage 610.

The processor also comprises an analysis module 622 for analysing the historical data obtained from storage 610. The analysis comprises determining a number of nodes based on the density of the data points such as by applying a K-means clustering algorithm as explained above with reference to FIG. 2. The analysis module 622 is also configured to apply the historical data to each of the determined nodes to determine the closest node for each data point for a given vehicle at a given time.

Once the historical data has been applied to the nodes, the nodes can be ordered based on the times associated with each of the data points assigned to the nodes. This is undertaken by ordering module 623 of the processor 620. Once ordered edges are generated by an edge generation module 624 which indicate transitions of vehicles within the historical data between the nodes of the route map. Based on these edges a route may be determined using a route determination module 625 which is then passed to an output module 626 for output to a control system 630.

In some examples, the processor 620 may also comprise a refinement module 627 for refining the route map based on a number of different methods, such as those described above in relation to method 200 of FIG. 2. The route refinement module 627 may comprise other modules for undertaking specific types of refinement most efficiently. Examples of such modules include a density analysis module 627$a$ for determining whether an edge should be removed from the route map based on the length of the edge and a calculated threshold. Similarly, the refinement module 627 may also comprise an obstacle analysis module 627$b$ for analysing one or more obstacles within the path of an edge, and determining whether to remove that edge from the route map. The obstacle analysis module 627*b* may be used, for example, to analyse whether an edge intersects a coastline as described above.

In some examples, it will be appreciated that the generation of the route map and the determination of a route for a given vehicle may be undertaken by separate processors. In such examples, the processor 620 configured to generate the route map may be separate from the processor configured to determine the route, shown as module 625 in FIG. 6. For example, the processor configured to generate the route map may be located on a central server of a logistics provider, and the route determination processor may be located with a vehicle itself. In such examples, it will be appreciated that the processors will be communicable coupled such as via a wired or wireless data connection.

The output module 626 of the processor 620 is configured to provide the determined route to a control system 630. The control system 630 may be the autopilot system of a vehicle, and/or a display configured to indicate the route for a vehicle. In some examples, by providing the route to the control system 630, the vehicle may be arranged to automatically follow that route until an alternative route is provided.

In some embodiments, the system 600 may form part of a vehicle, such as an autonomous vehicle, or part of a vehicles autopilot system. In yet further embodiments, the components of the system, such as the storage 610 or processor 620 may be separate from the vehicle itself and individual modules described as being part of the processor may indeed be separate and form part of a system on chip architecture.

Estimated Time of Arrival Based on Attributes for a Real-World Location

Determining an estimated time of arrival for a vehicle is a complex task that can be affected by any number of factors including the weather and congestion. Vehicles often traverse a pre-planned route for which an estimate of the time of arrival is provided, however commonly, there is little consideration as to the real-world environment through which the vehicle is travelling. The pre-planned route may be from an origin to a single destination, or multiple destinations and may include a number of other waypoints along the way. It is desirable to obtain an estimated time of arrival at the destination for the vehicle, although in some examples it can be beneficial to determine an estimated time of arrival at one or more of the waypoints along the route.

Figure 7:
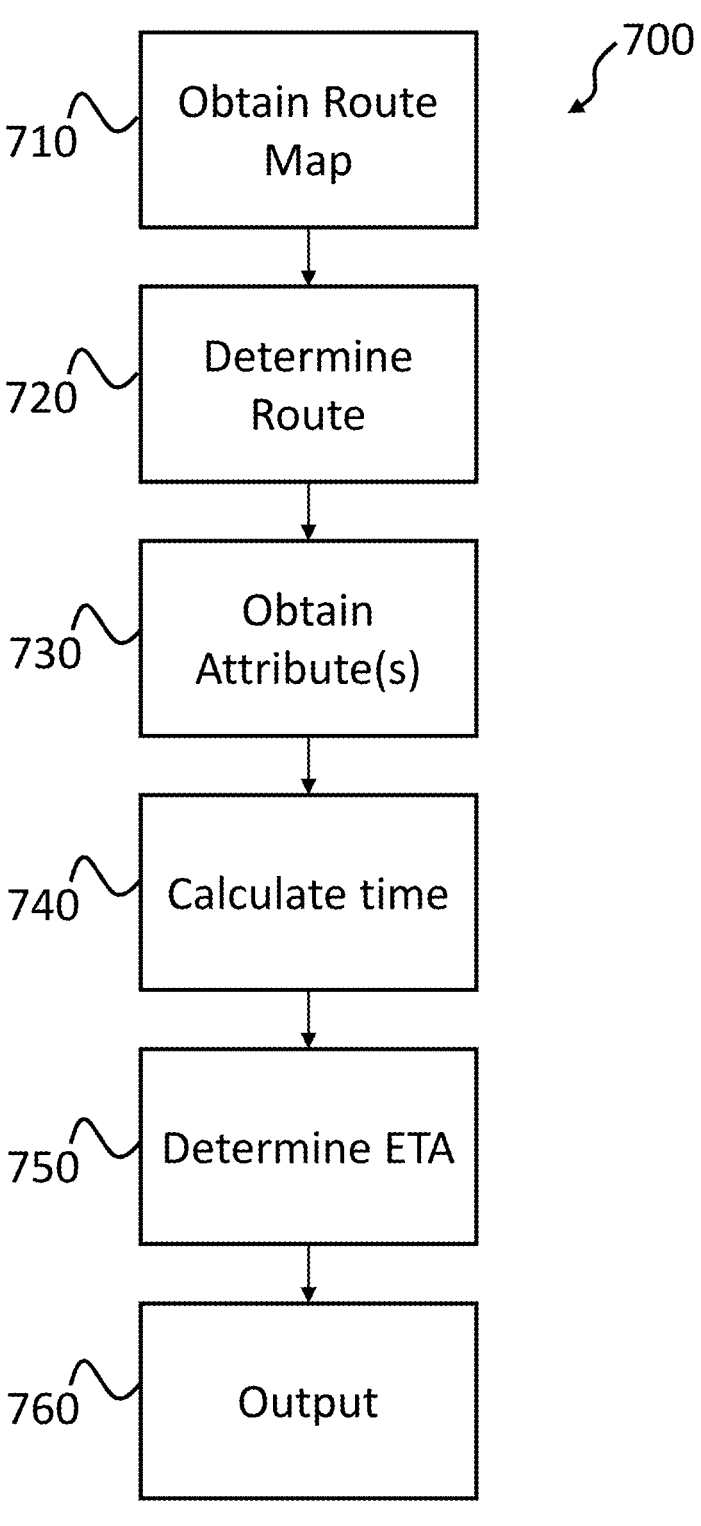
FIG. 7 is a flowchart showing a method for determining an estimated time of arrival according to an example.

FIG. 7 is a flowchart showing a method 700 for determining an estimated time of arrival of a vehicle at a given destination according to an example. At step 710 a route map is obtained from storage. The storage may be remote storage or storage forming part of a system as will be described below with reference to FIG. 9. The route map may be a route map generated as part of the method 200 described above in relation to FIGS. 2 to 5. The route map comprises a plurality of nodes representing real-world locations, such as the nodes generated based on the historical data obtained from a remote source such as AIS. The route map also comprises a number of edges connecting the nodes which are determined based on the historical data, and the movement of a vehicle from a first node to a second node.

Once a route map has been obtained from storage, at step 720, a route is determined from a current location of the vehicle to a destination of the vehicle. As mentioned above with reference to FIGS. 2 to 5, the route comprises a plurality of nodes and edges between nodes of the route map. It will be appreciated that the route may be determined in accordance with the method set out above or via any other suitable method of traversing the route map and determining a route. The route also comprises arrival times or information for the calculation of an arrival time at each given node along the route for the vehicle. These estimates of the arrival time may be based on known characteristics of the vehicle, such as average speed, size, and other characteristics as appropriate. The characteristics of the vehicle may be provided to a machine learning model trained to determine an estimated time of arrival based on at least these factors, such as the machine learning model 100 described above in relation to FIG. 1. In addition to the estimated time of arrival, the machine learning model 100, as described above, may also provide a confidence estimate indicating how confident the estimation of the arrival time is.

The route map is then used to determine an estimated time of arrival at the destination of the vehicle. Whilst estimates of the arrival time are provided and/or calculated based on known factors, during a journey via the determined route this estimated time of arrival can change due to a number of factors such as congestion and/or weather conditions. Such factors or attributes of the given route portion can be forecasted and regularly updated throughout the vehicle's journey. For example, weather conditions along a route may be regularly updated and as such have an impact on the estimated time of arrival.

Figure 8:
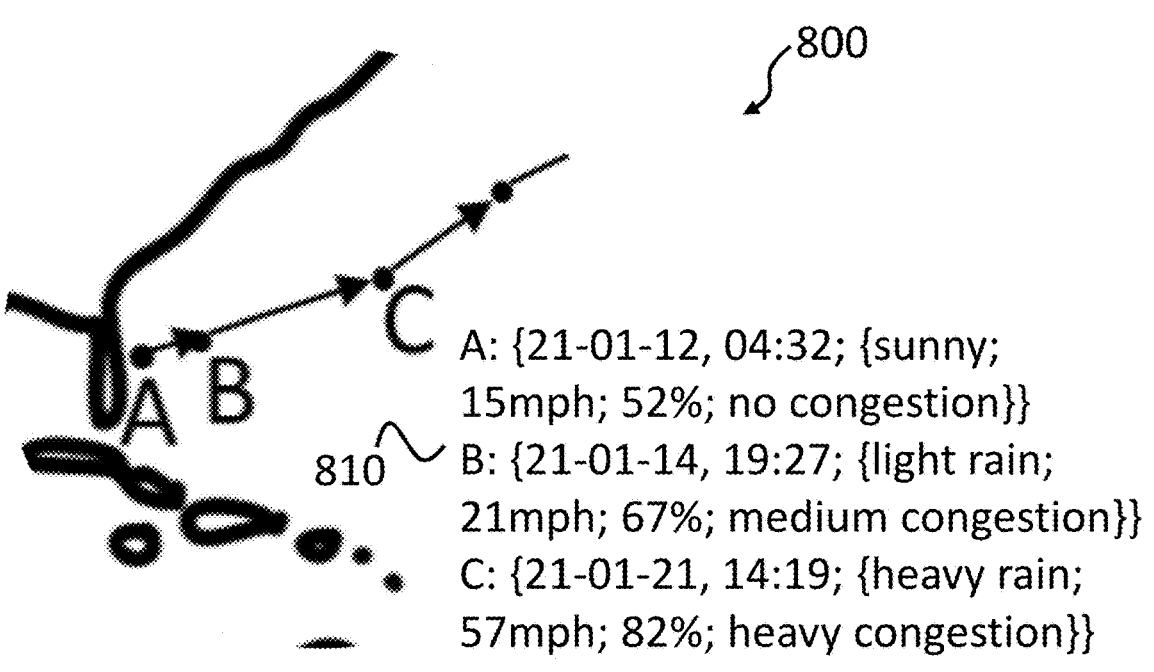
FIG. 8 is a representation of attributes associated with the nodes of a route according to an example.

To determine the impact of a particular attribute or factor of the route on the estimated time of arrival, at least one of the attributes needs to be obtained for the real-world location associated with a given node of the route. In step 730, such attributes are obtained. They may be obtained from data within the storage of the system, such as previous congestion information, or they may be obtained from a third-party or remote source, such as a weather forecast database. FIG. 8 shows an example 800 of the attribute data obtained for a given route where the vehicle is an ocean-going vessel. The attribute data 810 of FIG. 8 is obtained from a number of sources and is associated with the vessel arrival times at particular nodes. For example, the attribute data 810 indicates that a vessel is estimated to arrive at node B on 2021 Jan. 14 at 19:27, there will be light rain, a 21 miles per hour wind speed, a 67% humidity and medium congestion. This information can be used to determine whether it is likely that additional time will be required to transit along the edges connected to node B.

At step 740 the additional time is calculated. The additional time is based on the vehicle characteristics as well as the attributes associated with the node, such as the weather information, and the distance between the current node and the next node of the route. There are a number of methods for determining the additional time, however, in some examples, such as ocean-going vessels or aircraft, the additional time may be based on a theoretical additional distance to travel through the air or water, resulting in an increased power requirement. This may be represented as a linear relationship governed by the formula:

$$P_n = \sum_{i=1}^{n} \left( \frac{v_{E_i}}{d_{E_i}} \times v_h(t, C_i) \right)$$

where $P_n$ represents the power needed to transit along an edge or group of edges, $E_i$; $d_{E_i}$ represents the haversine distance between a first node, $C_{i-1}$, and a second node, $C_i$; $v_{E_i}$, represents the average speed of the vehicle along the edge; and $v_h(t, C_i)$ represents the headwind, $v_h$, at a given time t for the second node, $C_i$.

In other examples, the apparent wind speed may be used instead of the true headwind speed. This may be achieved by correcting the headwind speed, $v_h(t, C_i)$, by the vessel speed, $v_{E_i}$, as set out in the formula:

$$P_n = \sum_{i=1}^{n} \left( \frac{v_{E_i}}{d_{E_i}} \times \left( v_h(t, C_i) - v_{E_i} \right) \right) \qquad \text{(equation 3)}$$

In other examples, the relationship between the power required and the headwind is non-linear and may be represented by the formula:

$$P_n = \sum_{i=1}^{n} \left( \frac{v_{E_i}}{d_{E_i}} \times v_h^2(t, C_i) \right) \qquad \text{(equation 4)}$$

It will be appreciated that equation 4 may also use the apparent windspeed instead of true windspeed as set out in equation 3.

Sometimes the attributes obtained may have different levels of reliability. For example, weather forecasts are often less reliable the further in the future they are. In such embodiments, the effect that such information has on the additional power consumption, and therefore additional time, calculations may be minimized the further into the future the forecast is. This may be achieved by limiting the power consumption to a specific time-period, such as 12 hours or 24 hours, as set out in the following equations 5 and 6 where r is the factor by which to affect the power consumption calculation and $d_{t_{cut}}$ is the cut-off limit. Whilst the formula below uses equation 2 as the base, indicating a linear relationship, it will be appreciated that the cut-off may be applied to equations 3 and 4 as well.

$$r = \min\left( \max\left( d_{t_{cut}} - \sum_{i=1}^{n} \frac{v_{E_i}}{d_{E_i}}, 0 \right), 1 \right) \qquad \text{(equation 5)}$$

$$P_n = \sum_{i=1}^{n} \left( \frac{v_{E_i}}{d_{E_i}} \times v_h(t, C_i) \times r \right) \qquad \text{(equation 6)}$$

Once the time has been calculated based on the attribute information as set out above the method proceeds to step 750 where an updated estimated time of arrival can be calculated. The updated time of arrival may be calculated using the same machine learning model 100 as described above, trained using information including attribute data, such as congestion and/or weather forecasting information, the additional time calculated based on the attribute information, and the route and estimated times associated with the nodes in the route, as set out above in relation to step 720. The trained machine learning model 100 will output an estimated time of arrival based on these updated inputs, which, at step 760 is output to a control system of a vehicle. The control system may comprise a display or other processing component, such as an autopilot system enabling quick and efficient updates to the estimated time of arrival to be provided to clients and/or operators. In some examples, the vehicle may have some level of autonomy and updating the estimated time of arrival may result in an adjustment to the course to improve the estimated time of arrival if the updated time of arrival is later or a reduction in speed if the estimated time of arrival is sooner.

Figure 9:
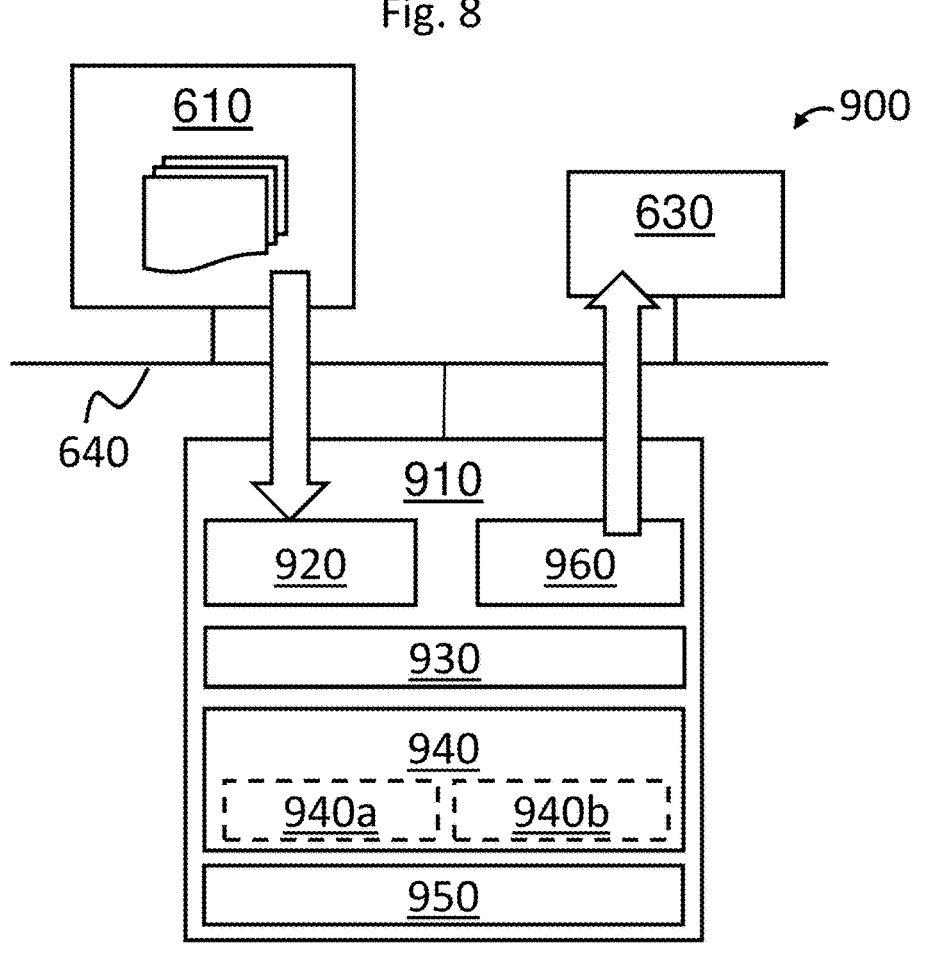
FIG. 9 is a schematic representation of a system for determining an estimated time of arrival according to an example.

In some embodiments, method 700 may be implemented as part of a system. FIG. 9 is a schematic example of a system 900 for determining an updated estimated time of arrival based on one or more attributes associated with real-world locations of the nodes of a route. The updated estimate time of arrival is provided to a control system 630. It will be appreciated that the components of system 900 are similar to those of system 600 described above in relation to FIG. 6, and in some examples, may be the same system, comprising common storage 610 and output control systems 630.

The storage 610 is configured to store at least a route map, such as the route map generated by method 200 of FIG. 2. In some examples, the storage is also configured to store the attributes used to determine the estimated time of arrival. For example, the storage 610 may store historical congestion information and may be configured to receive updated weather forecasts periodically.

The system 900 comprises a processor 910, the processor is configured to undertake the method 700 described in relation to FIG. 7. In some examples, the processor 910 may be the same processor 620 described above in relation to FIG. 6 or may be an entirely separate processor connected to the system via a system bus 640 or other wired or wireless connection enabling the components of the system to communicate across a network such as the Internet. For example, the storage 610 may be remote storage, such as cloud storage, or hard drives forming part of a remote server.

The processor 910 is configured to determine an up-to-date estimate of an arrival time and comprises a route determination module 920 configured to obtain at least the route map from the storage 610. The route determination module 920 is also configured to determine a route based on the route map. In some examples, the determination of the route may be undertaken by a separate processor, such as processor 620 described above, on a central server, whereas any updates to the estimated times of arrival may be undertaken by a processor, such as processor 910 in the vehicle itself. The processor 910 also comprises an attribute collection module 930 which is configured to receive attribute data such as weather forecast data and congestion data. The attribute data may be obtained from the storage 610, a third party or external source via a network connection such as the Internet.

Once the attribute data is obtained a time calculation module 940 is configured to determine a time for transiting along at least one edge of the route. The time calculation module 940 may comprise components to implement the functions described above in equations 2-6 using hardware. For example, the time calculation module may comprise a linear computation module 940a specifically configured to implement equations 2, 3, 5 and 6 and a quadratic computation module 940b configured to implement equation 6 and variations thereof.

The processor 920 also comprises a machine learning module 950. The machine learning module 950 is configured specifically for implementing machine learning models and may be a neural processing unit, or graphics processing unit capable of undertaking large numbers of parallel processes. The machine learning module 950 may be a separate component of the system 900 such as a separate neural processing unit connected to the other components of the system via the system bus 640. The machine learning module 950 is configured to implement a machine learning model such as the machine learning model 100 described above in relation to FIG. 1 and receive inputs comprising at least the attribute information, the time information for each edge, and information regarding the route.

Following the determination of the estimated time of arrival, this information is passed to an output module 960 of the processor 910 which is configured to provide the estimated time of arrival to a control system 630. The control system 630 may be the autopilot system of a vehicle, and/or a display configured to indicate the route for a vehicle. In some examples, by providing the route to the control system 630, the vehicle may be arranged to automatically follow that route until an alternative route is provided.

In some embodiments, the system 900 may form part of a vehicle, such as an autonomous vehicle, or part of a vehicles autopilot system. In yet further embodiments, the components of the system, such as the storage 610 or processor 620 may be separate from the vehicle itself, and individual modules described as being part of the processor 910 may indeed be separate and form part of a system on chip architecture.

Estimated Time of Arrival Based on Attributes for Nearby Real-World Locations

Determining an estimated time of arrival for a vehicle is a complex task that can be affected by any number of factors including the weather and congestion. Vehicles often traverse a pre-planned route for which an estimate of the time of arrival is provided, however commonly, there is little consideration as to the real-world environment through which the vehicle is travelling. The pre-planned route may be from an origin to a single destination, or multiple destinations and may include a number of other waypoints along the way. It is desirable to obtain an estimated time of arrival at the destination for the vehicle, although in some examples it can be beneficial to determine an estimated time of arrival at one or more of the waypoints along the route. In some cases, it may be desirable to determine whether there is an alternative route to take which may improve the estimated time of arrival in order to most efficiently transit from the origin to a destination.

Figure 10:
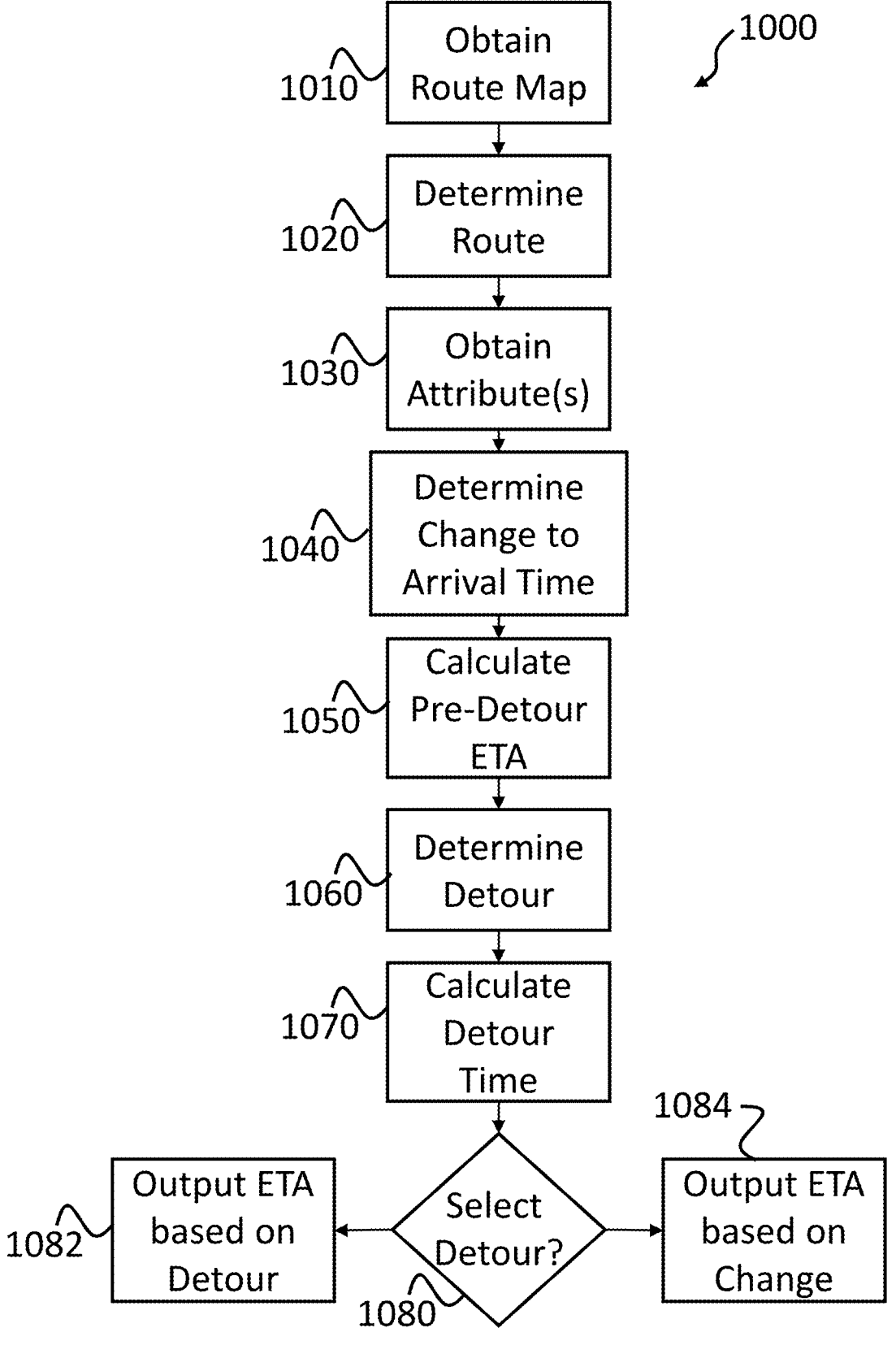
FIG. 10 is a flowchart showing a method for determining a detour and estimated time of arrival according to an example.

FIG. 10 is a flowchart showing a method 1000 for determining an estimated time of arrival of a vehicle at a given destination according to an example. At step 1010 a route map is obtained from storage. The storage may be remote storage or storage forming part of a system as will be described below with reference to FIG. 12. The route map may be a route map generated as part of the method 200 described above in relation to FIGS. 2 to 5. The route map comprises a plurality of nodes representing real-world locations, such as the nodes generated based on the historical data obtained from a remote source such as AIS. The route map also comprises a number of edges connecting the nodes which are determined based on the historical data, and the movement of a vehicle from a first node to a second node.

Once a route map has been obtained from storage, at step 1020, a route is determined from a current location of the vehicle to a destination of the vehicle. As mentioned above with reference to FIGS. 2 to 5, the route comprises a plurality of nodes and edges between nodes of the route map. It will be appreciated that the route may be determined in accordance with the method set out above or via any other suitable method of traversing the route map and determining a route. The route also comprises arrival times or information for the calculation of an arrival time at each given node along the route for the vehicle. These estimates of the arrival time may be based on known characteristics of the vehicle, such as average speed, size, and other characteristics as appropriate. The characteristics of the vehicle may be provided to a machine learning model trained to determine an estimated time of arrival based on at least these factors, such as the machine learning model 100 described above in relation to FIG. 1. In addition to the estimated time of arrival, the machine learning model 100, as described above, may also provide a confidence estimate indicating how confident the estimation of the arrival time is.

The route map is then used to determine an estimated time of arrival at the destination of the vehicle. Whilst estimates of the arrival time are provided and/or calculated based on known factors, during a journey via the determined route this estimated time of arrival can change due to a number of factors such as congestion and/or weather conditions as described above with reference to FIGS. 7 to 9. Such factors or attributes of the given route portion can be forecasted and regularly updated throughout the vehicle's journey. For example, weather conditions along a route may be regularly updated and as such have an impact on the estimated time of arrival. In some examples, a consideration of the weather conditions and/or congestion or other attributes further along the route is also undertaken and used to update the estimated time of arrival and in some cases used to calculate a detour to avoid the adverse condition. This results in the vehicle deviating from the standard or shortest route, and therefore any delay calculated may be used to indicate whether it is beneficial to take a detour route or wait for the adverse conditions to abate.

To determine the impact of a particular attribute or factor of the route on the estimated time of arrival, at least one of the attributes needs to be obtained for a predetermined real-world location in the vicinity of a given node of the route. In step 1030, such attributes are obtained. They may be obtained from data within the storage of the system, such as previous congestion information, or they may be obtained from a third-party or remote source, such as a weather forecast database. As described above, FIG. 8 shows an example 800 of the attribute data obtained for a given route where the vehicle is an ocean-going vessel. The attribute data 810 of FIG. 8 is obtained from a number of sources and is associated with the vessel arrival times at particular nodes. For example, the attribute data 810 indicates that a vessel is estimated to arrive at node B on 2021 Jan. 14 at 19:27, there will be light rain, a 21 miles per hour wind speed, a 67% humidity and medium congestion. This information can be used to determine whether it is likely that additional time will be required to transit along the edges connected to node B.

In some examples, the attribute may comprise humidity information, especially at destinations. When the vehicle is an ocean-going vessel, increased humidity around a destination port can result in poor visibility which affects the ability of a vessel to dock in a port. As such there may be a delay associated with arriving at the destination, which in turn will adversely affect the estimated time of arrival.

Figure 11:
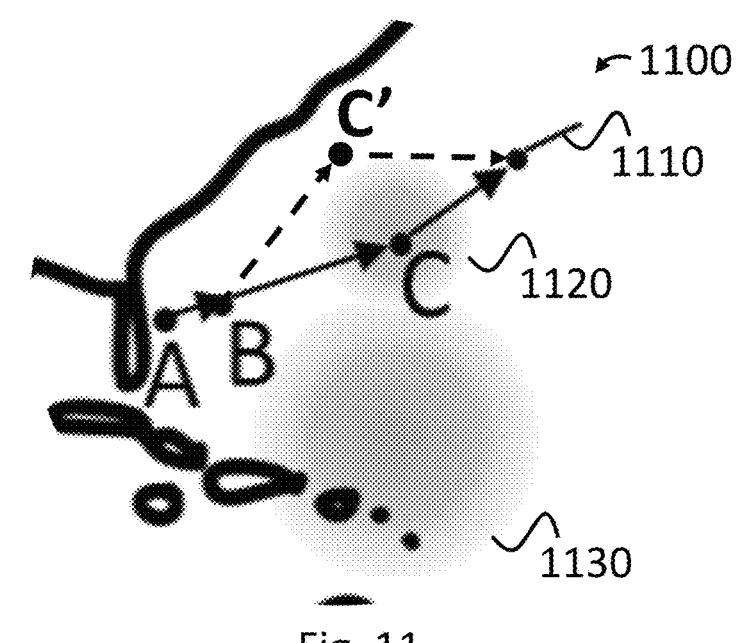
FIG. 11, is a representation of a detour route according to an example.

FIG. 11 shows an example 1100 of how weather conditions in a predetermined area may affect a route 1110 of an ocean-going vessel. A first area of adverse weather 1120 and a second area of adverse weather 1130 are shown. The first area of adverse weather 1120 is within close vicinity of the route 1110 near node C. In this case, the method 1000 is used to determine whether a detour is necessary or whether the route 1110 can proceed as originally calculated. The attributes obtained can be used to determine whether an action is required based on the severity of the effect the attribute is likely to have on the estimated arrival time.

Returning to method 1000 once the attributes of a predetermined area have been obtained, the method 1000 proceeds to step 1040 where determined whether there is a change to the vehicle arrival time. Determining whether there will be a change in arrival time is based on at least the determined route, the attributes obtained, and the vehicle arrival time at a given node. For example, if there are adverse weather conditions in the vicinity of a vessel as shown in FIG. 11, then there is likely to be an impact on the vessel arrival time at a given destination.

If there is likely to be an impact on the vehicle arrival time, an updated estimate of the arrival time is calculated at step 1050. The updated estimate is calculated using a trained machine learning model such as the machine learning model 100 described above in reference to FIG. 1 and is representative of the estimate of the arrival time before any detour being undertaken and/or calculated. The machine learning model is configured to receive at least the attributes for the predetermined area, and time information based on the expected arrival time of the vehicle at the nodes of a route. This information can be used to interpolate the attribute information for the expected arrival time of the vehicle at a given location. In some examples, the updated estimated arrival time may be calculated using the method 700 described above in reference to FIG. 7.

Once it is determined whether there is a change to the arrival time, and the estimated pre-detour arrival time is calculated the method proceeds to step 1060 where a detour route is determined. The detour route may be calculated as described above in relation to method 200 of FIG. 2, whereby an A* search between a start node and an end node is undertaken on a subset of the nodes of the route map. The subset may comprise all nodes within an area that avoid the particular attribute such as the adverse weather event or congestion. For example, in example 1100 of FIG. 11, a detour via node C' is determined which avoids the first area of adverse weather 1120 such that a vessel progresses from node B to node C' instead of to node C. It will be appreciated that the detour route may comprise a plurality of other nodes, rather than just a single node. In examples where the predetermined area surrounds a destination, such as a destination port of a vessel, and the attributes indicate that there will be reduced visibility in and around the destination, the detour route may involve transiting to another destination before returning to the original destination.

Once a detour route has been determined, an estimated time for transiting the detour is calculated at step 1070. The estimated time for transiting the detour is calculated using the trained machine learning model, such as the machine learning model 100 described above in relation to FIG. 1. Once the detour time has been calculated, at step 1080, it can be determined whether to select the detour route based on the pre-detour estimated time of arrival and the estimated time for transiting the detour.

Determining whether to select a detour may involve a number of options as will be appreciated by the skilled person. If the effect of the detour route on the estimated time of arrival is large, then method 1000 will proceed to step 1084 where the estimated time of arrival is based on the change to the arrival time calculated at step 1040 and is output to a control system, else the method 1000 proceeds to step 1082 where the estimated time of arrival is based on the detour time and is output to a control system. The control system may comprise a display or other processing component, such as an autopilot system enabling quick and efficient updates to the estimated time of arrival to be provided to clients and/or operators.

In some examples, determining whether to take a detour may involve determining whether decreasing or increasing the speed of the vehicle is an option, such as avoiding the attribute which causes the delay. In some examples, the detour route itself may in fact be a wait period introduced to allow the adverse conditions to pass before resuming the journey. Similarly, vehicle characteristics such as size and average speed capabilities may affect the detour options. For example, a larger ocean-going vessel may be capable of weathering larger storms than a smaller ocean-going vessel.

Figure 12:
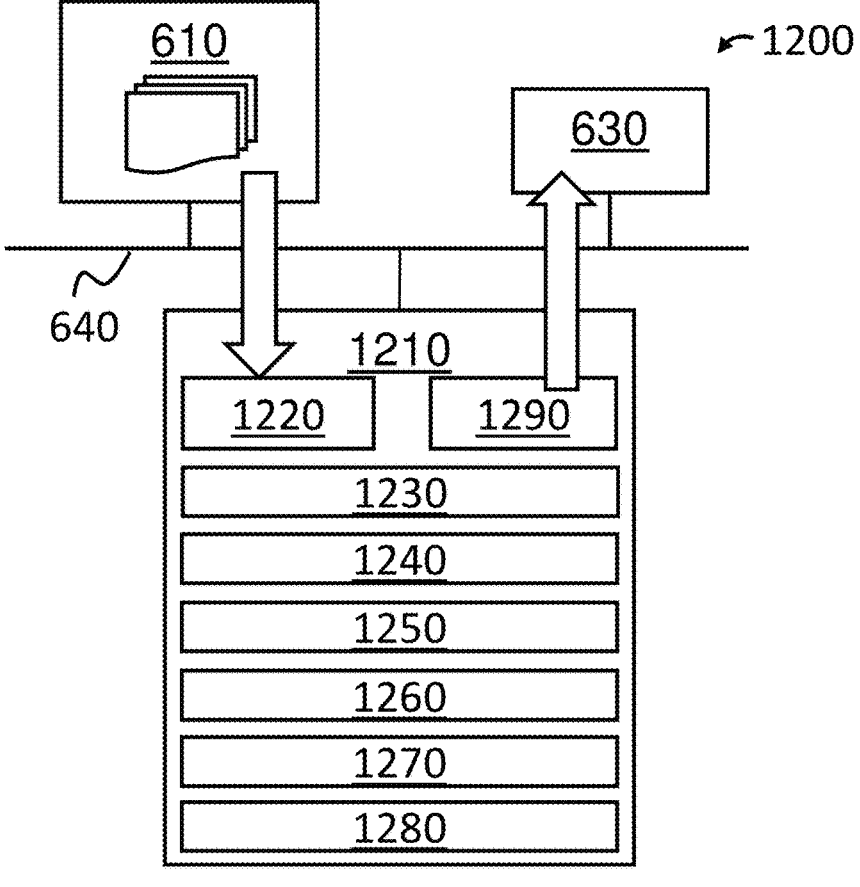
FIG. 12 is a schematic representation of a system for determining a detour and estimated time of arrival according to an example.

In some embodiments, method 1000 may be implemented as part of a system. FIG. 12 is a schematic example of a system 1200 for determining an updated estimated time of arrival based on one or more attributes associated with real-world locations of the nodes of a route. The updated estimate time of arrival is provided to a control system 630. It will be appreciated that the components of system 1200 are similar to those of systems 600 and 900 described above in relation to FIGS. 6 and 9, and in some examples, may be the same system, comprising common storage 610 and output control systems 630.

The storage 610 is configured to store at least a route map, such as the route map generated by method 200 of FIG. 2. In some examples, the storage is also configured to store the attributes used to determine the estimated time of arrival. For example, the storage 610 may store historical congestion information and may be configured to receive updated weather forecasts periodically.

The system 1200 comprises a processor 1210, the processor is configured to undertake the method 1000 described in relation to FIG. 10. In some examples, the processor 1210 may be the same processor 620, 910 described above in relation to FIGS. 6 and 9 or may be an entirely separate processor connected to the system via a system bus 640 or other wired or wireless connection enabling the components of the system to communicate across a network such as the Internet. For example, the storage 610 may be remote storage, such as cloud storage, or hard drives forming part of a remote server.

The processor 1210 is configured to determine an up-to-date estimate of an arrival time and comprises a route determination module 1220 configured to obtain at least the route map from the storage 610. The route determination module 1220 is also configured to determine a route based on the route map. In some examples, the determination of the route may be undertaken by a separate processor, such as processor 620, 910 described above, on a central server, whereas any updates to the estimated times of arrival may be undertaken by a processor, such as processor 1210 in the vehicle itself. The processor 1210 also comprises an attribute collection module 1230 which is configured to receive attribute data such as weather forecast data and congestion data for a predetermined area surrounding at least one of the plurality of nodes. The attribute data may be obtained from the storage 610, a third party or external source via a network connection such as the Internet.

The processor 1210 also comprises a detour determination module 1250 for determining a detour route for the vehicle based on the route map where the attribute data indicates there is likely to be a delay. The detour determination module 1250 may also be configured to determine whether a delay period such as a wait time would be more appropriate than determining a detour route. Machine learning module 1260 is then used to determine a pre-detour estimated time of arrival based on the at least one attribute for the predetermined area, and a time for transiting each edge of the determined route. The machine learning module 1260 is also used to determine an estimated time for transiting the detour based on the at least one attribute and the detour route.

The machine learning module 1260 is configured specifically for implementing machine learning models and may be a neural processing unit, or graphics processing unit capable of undertaking large numbers of parallel processes. The machine learning module 1260 may be a separate component of the system 1200 such as a separate neural processing unit connected to the other components of the system via the system bus 640. The machine learning module 1260 is configured to implement a machine learning model such as the machine learning model 100 described above in relation to FIG. 1 and receive inputs comprising at least the attribute information, the time information for each edge, and information regarding the route.

The processor 1210 also comprises a route selection module 1270 configured to determine whether to select the detour route based on at least the pre-detour estimated time of arrival and the estimated time for transiting the detour route. In some examples, the route selection module 1270 is configured to determine whether to decrease the speed of the vehicle, increase the speed of the vehicle or take a detour route depending on the length of time required to transit the detour.

In some examples, the processor 1210 may comprise a vehicle analysis module to determine whether there is likely to be a change to the estimated time of arrival based on at least one characteristic of the vehicle since vehicle characteristics such as size and average speed capabilities may affect the detour options. For example, a larger ocean-going vessel may be capable of weathering larger storms than a smaller ocean-going vessel.

Once the route selection module 1270 has determined whether to undertake the detour, an estimated time of arrival module 1280 is used to determine the estimated time of arrival based on whether the detour was selected. The estimated time of arrival is passed to an output module 1290 of the processor 1210 which is configured to provide the estimated time of arrival to a control system 630. The control system 630 may be the autopilot system of a vehicle, and/or a display configured to indicate the route for a vehicle. In some examples, by providing the route to the control system 630, the vehicle may be arranged to automatically follow that route until an alternative route is provided.

In some embodiments, the system 1200 may form part of a vehicle, such as an autonomous vehicle, or part of a vehicles autopilot system. In yet further embodiments, the components of the system, such as the storage 610 or processor 620 may be separate from the vehicle itself, and individual modules described as being part of the processor 1210 may indeed be separate and form part of a system on chip architecture.

Estimated Time of Arrival for Multiple Destinations

Determining an estimated time of arrival for a vehicle is a complex task that can be affected by any number of factors including the weather and congestion, this is particularly evident when the estimated time of arrival is for multiple destinations since a delay at one destination can impact the arrival time of the vehicle at a subsequent destination. Vehicles often traverse a pre-planned route for which an estimate of the time of arrival is provided, however commonly, there is little consideration as to the real-world environment through which the vehicle is travelling. The pre-planned route may comprise multiple destinations and may include a number of other waypoints along the way. It is desirable to obtain an estimated time of arrival at the destination for the vehicle, although in some examples it can be beneficial to determine an estimated time of arrival at one or more of the waypoints along the route, such as intermediary destinations.

Figure 13:
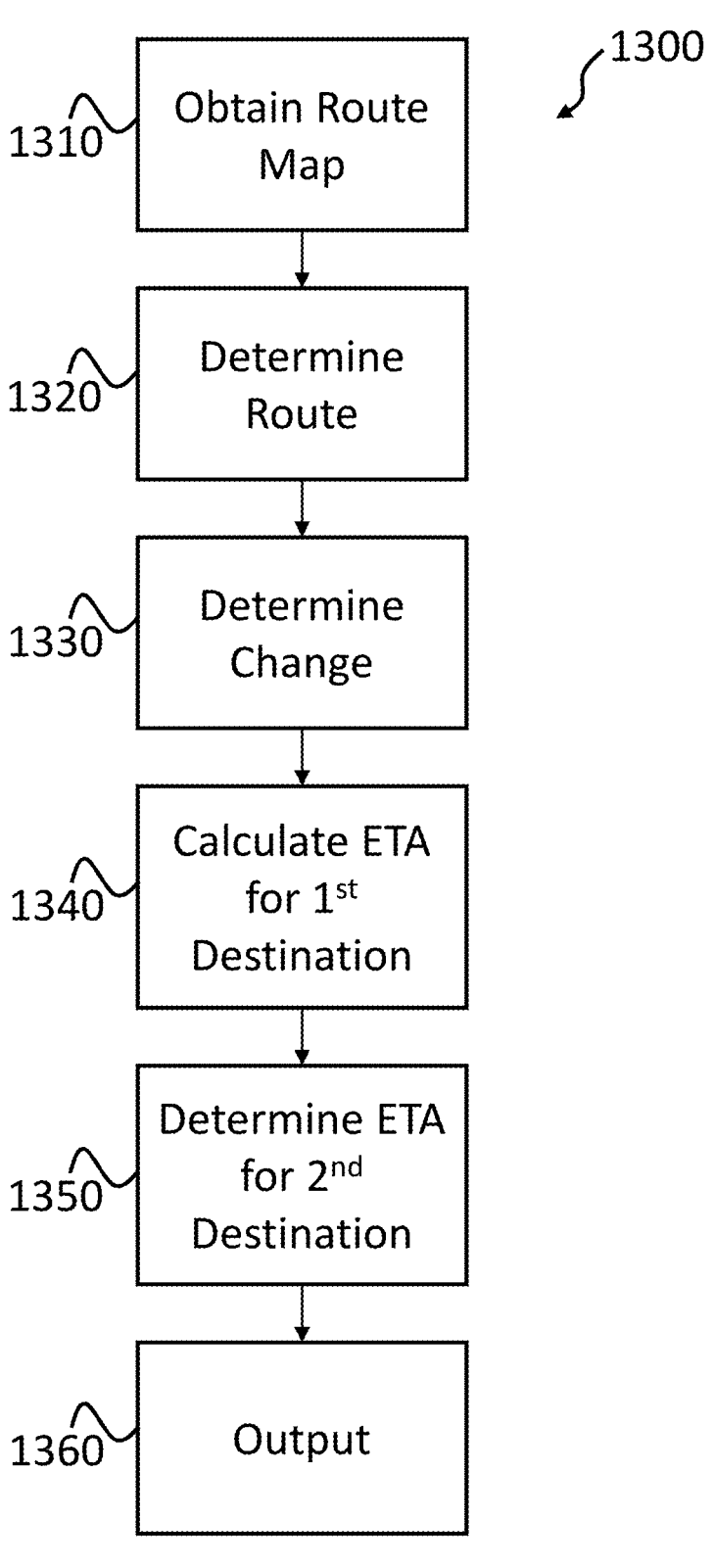
FIG. 13 is a flowchart showing a method for determining an estimated time of arrival for a plurality of destinations according to an example.
Figure 14:
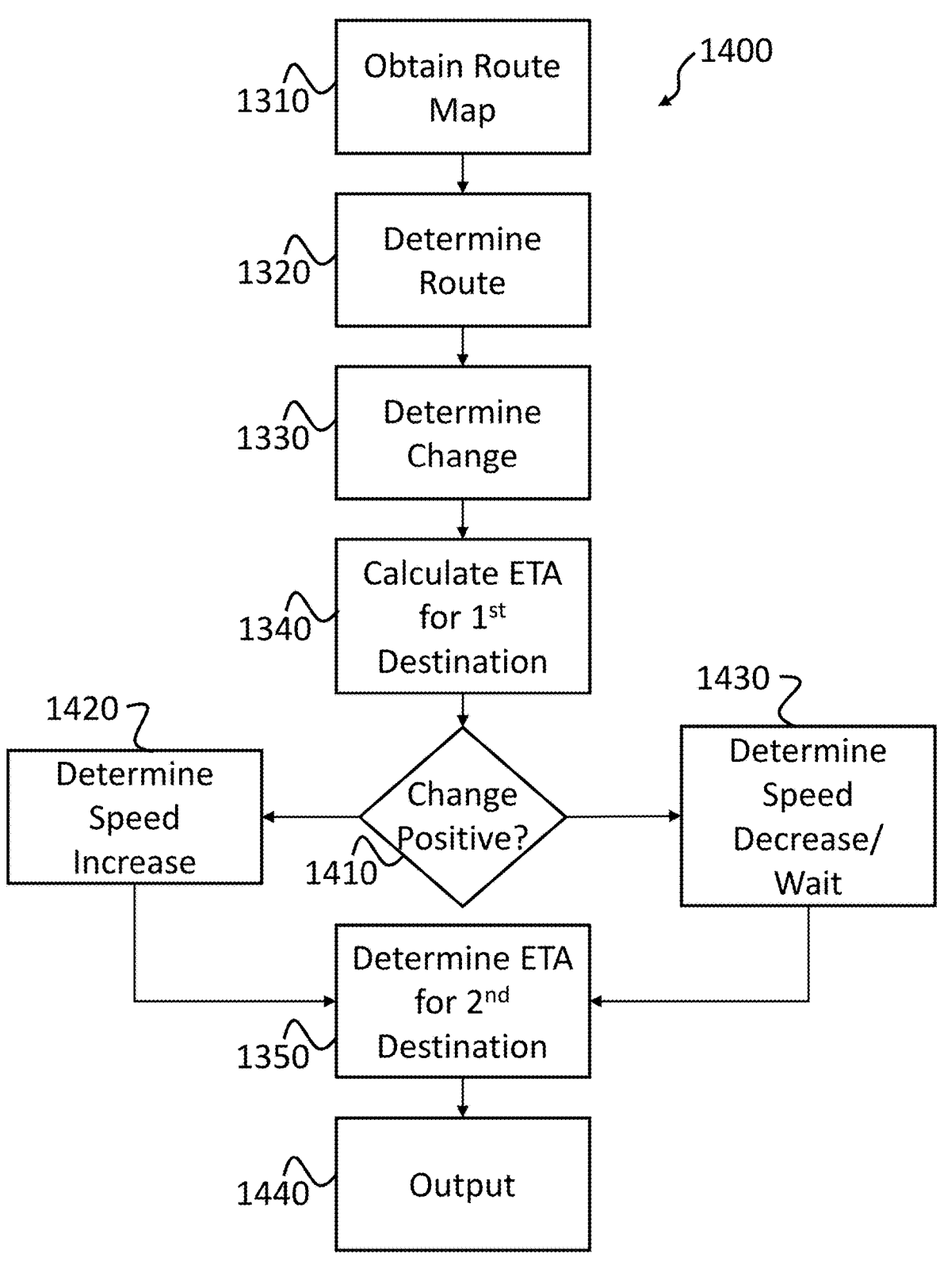
FIG. 14 is a flowchart showing a method for determining an estimated time of arrival for a plurality of destinations according to a second example.

FIGS. 13 and 14 are flow charts showing methods 1300, 1400 for determining an estimated time of arrival of a vehicle at multiple destinations according to an example. At step 1310 a route map is obtained from storage. The storage may be remote storage or storage forming part of a system as will be described below with reference to FIG. 15. The route map may be a route map generated as part of the method 200 described above in relation to FIGS. 2 to 5. The route map comprises a plurality of nodes representing real-world locations, such as the nodes generated based on the historical data obtained from a remote source such as AIS. The route map also comprises a number of edges connecting the nodes which are determined based on the historical data, and the movement of a vehicle from a first node to a second node.

Once a route map has been obtained from storage, at step 1320, a route is determined from a current location of the vehicle to a destination of the vehicle. As mentioned above with reference to FIGS. 2 to 5, the route comprises a plurality of nodes and edges between nodes of the route map. It will be appreciated that the route may be determined in accordance with the method set out above or via any other suitable method of traversing the route map and determining a route. The route also comprises arrival times or information for the calculation of an arrival time at each given node along the route for the vehicle. These estimates of the arrival time may be based on known characteristics of the vehicle, such as average speed, size, and other characteristics as appropriate. The characteristics of the vehicle may be provided to a machine learning model trained to determine an estimated time of arrival based on at least these factors, such as the machine learning model 100 described above in relation to FIG. 1. In addition to the estimated time of arrival, the machine learning model 100, as described above, may also provide a confidence estimate indicating how confident the estimation of the arrival time is. The determined route comprises a plurality of destinations, for example, where the vehicle is a vessel, the route may comprise a number of destination ports, and estimated times of arrival for each destination port.

Once the route has been determined, at step 1330 it is determined whether there is a change to the vehicle arrival time at the first destination. In some examples, determining whether there will be a change in arrival time at the first destination may be based on methods 700, 1000 previous discussed above in relation to FIGS. 7 and 10. Once it is determined that there will be a change, then at step 1340, an updated estimated time of arrival is calculated using a first machine learning model, such as machine learning model 100 described above in relation to FIG. 1.

Based on the updated estimated time of arrival, a new estimated time of arrival can be calculated at step 1350 using a second trained machine learning algorithm. The second trained machine learning algorithm may be based on the machine learning model 100 described above in relation to FIG. 1, however, it may be trained on a different data set than the first machine learning model. The second machine learning model receives different inputs, in particular, it receives the change in the arrival time at the first destination and the original estimated time of arrival. This enables the second machine learning algorithm to determine the estimated time of arrival at the second destination whilst taking into account and previous changes to the arrival time at the first destination.

At step 1360, the updated estimated times of arrival are output to a control system of a vehicle. The control system may comprise a display or other processing component, such as an autopilot system enabling quick and efficient updates to the estimated time of arrival to be provided to clients and/or operators.

In some examples, additional information may be provided to determine the updated estimated time of arrival at the second destination. As shown in method 1400 of FIG. 14, at step 1410 it may be determined whether the change to the estimated time of arrival is positive or negative. If the change is positive, then, at step 1420, it may be determined that the speed of the vehicle can be increased to avoid or mitigate the delay in arrival at the first destination, thereby reducing the delay in the arrival time at the second destination. Conversely, if the delay is negative, that is the vehicle arrives at the first destination ahead of schedule, then then a speed decrease or wait period may be implemented such that the vehicle does not arrive at the first or second destination ahead of schedule. Such increases or decreases in speed may be output to the control system of the vehicle, such as an autopilot system such that the vehicle's speed is adjusted automatically, and clients and/or operators are provided with the most up-to-date estimates for the time of arrival, which differ minimally from their scheduled arrival times. In some examples detours and/or rearranging of destinations may result from a change to the estimated time of arrival such that the schedule is impacted as little as possible.

Figure 15:
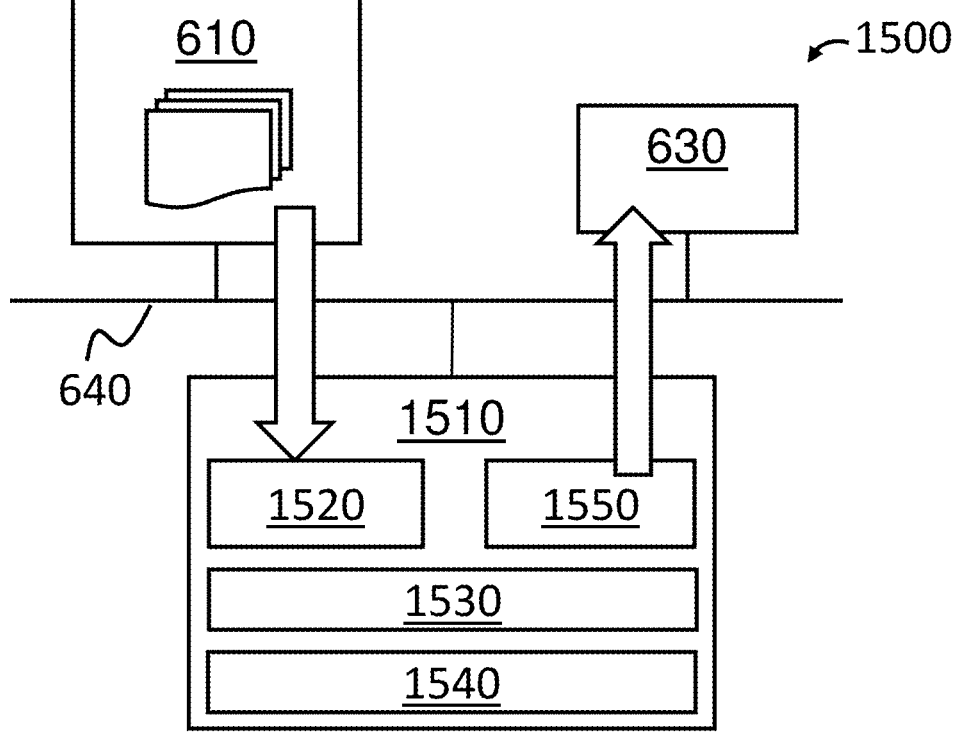
FIG. 15 is a schematic representation of a system for determining an estimated time of arrival for a plurality of destinations according to an example.

In some embodiments, methods 1300 and 1400 may be implemented as part of a system. FIG. 15 is a schematic example of a system 1500 for determining an updated estimated time of arrival based on one or more attributes associated with real-world locations of the nodes of a route. The updated estimate time of arrival is provided to a control system 630. It will be appreciated that the components of system 1500 are similar to those of systems 600, 900, and 1200 described above in relation to FIGS. 6, 9, and 12, and in some examples, may be the same system, comprising common storage 610 and output control systems 630.

The storage 610 is configured to store at least a route map, such as the route map generated by method 200 of FIG. 2. In some examples, the storage is also configured to store the attributes used to determine the estimated time of arrival. For example, the storage 610 may store historical congestion information and may be configured to receive updated weather forecasts periodically.

The system 1500 comprises a processor 1510, the processor is configured to undertake the methods 1300, 1400 described in relation to FIGS. 13 and 14. In some examples, the processor 1510 may be the same processor 620, 910, 1210 described above in relation to FIGS. 6, 9 and 12, or may be an entirely separate processor connected to the system via a system bus 640 or other wired or wireless connection enabling the components of the system to communicate across a network such as the Internet. For example, the storage 610 may be remote storage, such as cloud storage, or hard drives forming part of a remote server.

The processor 1510 is configured to determine an up-to-date estimate of an arrival time for multiple destinations and comprises a route determination module 1520 configured to obtain at least the route map from the storage 610. The route determination module 1520 is also configured to determine a route based on the route map. In some examples, the determination of the route may be undertaken by a separate processor, such as processor 620, 910, 1210 described above, on a central server, whereas any updates to the estimated times of arrival may be undertaken by a processor, such as processor 1510 in the vehicle itself.

The processor 1510 also comprises an arrival time calculation module 1530 for determining an estimated time of arrival for the vehicle at the first destination based on a number of route and vehicle characteristics as described above.

The processor 1510 also comprises a machine learning module 1540. The machine learning module 1540 is configured specifically for implementing machine learning models and may be a neural processing unit, or graphics processing unit capable of undertaking large numbers of parallel processes. The machine learning module 1540 may be a separate component of the system 1500 such as a separate neural processing unit connected to the other components of the system via the system bus 640. The machine learning module 1510 is configured to implement a machine learning model such as the machine learning model 100 described above in relation to FIG. 1 and is configured to determine changes to the estimated time of arrival at the first destination as described above in relation to method 700 and 1000 of FIGS. 7 and 10. The machine learning module 1540 may also be configured to implement a second trained machine learning model to determine an updated estimated time of arrival at the second destination based on at least the estimated time of arrival at the first destination and the change to the estimated time of arrival for the first destination.

In some examples, the processor 1510 may be configured to determine changes to the arrival time of the second destination and use the second machine learning model to calculate an updated estimate of the arrival time to a third or subsequent destination in accordance with methods 1300 and 1400 described above. The processor 1510 may also be configured to determine one or more actions to take in order to minimize the impact of any changes to the estimated arrival times. For example, where the change is positive, that is the vehicle is due to arrive at the first destination later than expected, the processor 1510 may be configured to instruct the vehicle's autopilot system to increase the speed. Similarly, where the change is negative, that is the vehicle is due to arrive at the first destination earlier than expected, the processor 1510 may be configured to instruct the vehicle's autopilot system to decrease the speed or introduce a wait period.

The processor 1510 also comprises an output module 1550 which is configured to provide the estimated time of arrival to a control system 630. The control system 630 may be the autopilot system of a vehicle, and/or a display configured to indicate the route for a vehicle. In some examples, by providing the route to the control system 630, the vehicle may be arranged to automatically follow that route until an alternative route is provided.

In some embodiments, the system 1500 may form part of a vehicle, such as an autonomous vehicle, or part of a vehicles autopilot system. In yet further embodiments, the components of the system, such as the storage 610 or processor 620 may be separate from the vehicle itself, and individual modules described as being part of the processor 1210 may indeed be separate and form part of a system on chip architecture.

CONCLUSION

Example embodiments of the present invention have been discussed, with particular reference to the examples illustrated. However, it will be appreciated that variations, modifications, and combinations of features described may be made without departing from the scope of the invention as defined by the appended claims.

The invention claimed is:

1. A method for determining a route for an ocean vessel, the method comprising the steps of:

generating a route map, wherein the generation of the route map comprises:

obtaining historical data for a plurality of ocean vessel from a storage, the historical data comprising a plurality of data points for each of the plurality of ocean vessels;

determining a plurality of nodes each to represent a subset of the data points of the historical data;

applying the historical data to the plurality of nodes by determining a closest node for each data point;

ordering the plurality of nodes for each of the plurality of ocean vessel in the historical data based on timestamps of respective data points for each ocean vessel corresponding to each node;

generating a directed edge between a first node of the plurality of ordered nodes and a second node of the plurality of ordered nodes, when the historical data indicates that a given ocean vessel has transited from the first node to the second node based on the timestamp of the respective data point for the ocean vessel;

refining the route map by reducing the number of edges based on a threshold length determined using average distances from data points to their respective closest nodes; and determining the route for the ocean vessel based on the generated route map;

outputting the determined route to a control system;

identifying an area of adverse weather associated with the route;

determining, based at least in part on one or more of a location of the area of adverse weather or a severity of the adverse weather, to update the route for the ocean vessel;

determining an updated route for the ocean vessel based on the generated route map and the area of adverse weather; and autonomously navigating the ocean vessel along the determined updated route by the control system.

2. The method according to claim 1, wherein refining the route map is based on at least one of a density of the plurality of nodes and one or more obstacles.

3. The method according to claim 2, wherein refining the route map based on the density of the plurality of nodes comprises:

determining a first group of data points where the first node is the closest node;

determining a second group of data points where the second node is the closest node;

calculating a first average distance from each of the data points in the first group to the first node and a second average distance from each of the data points in the second group to the second node;

determining a threshold length of the directed edge based on the first average distance and second average distance calculated; and filtering the edges based on the threshold length.

4. The method according to claim 2, wherein refining the route map based on one or more obstacles comprises:

obtaining geographical information representing at least an obstacle in a given area;

identifying whether one or more edges of the route map intersect the obstacle;

determining whether to delete one or more of the identified edges; and refining the route map based on the determination.

5. The method according to claim 1, wherein the step of determining the route for the ocean vessel comprises:

categorizing the ocean vessel based on at least a size characteristic of the ocean vessel;

obtaining a current location of the ocean vessel;

determining a start node in the route map that is closest to the current location of the ocean vessel;

determining an end node in the route map that is closest to a destination of the ocean vessel;

performing a search on the route map to determine the route corresponding to the shortest distance between the start node and the end node wherein the start node and the end node comprise a type corresponding to the size characteristic of the ocean vessel; and replacing the start node with the current location of the ocean vessel, and the end node with the destination of the ocean vessel.

6. A system for generating a route for an ocean vessel, the system comprising:

storage for storing historical data for a plurality of ocean vessels, the historical data comprising a plurality of data points for each of the plurality of ocean vessels;

at least one processor for generating a route map and determine a route, the processor comprising:

an input module for obtaining the historical data from storage;

an analysis module for determining a plurality of nodes each to represent a subset of the data points of the historical data, and applying the historical data to the plurality of nodes by determining a closest node for each of the plurality of data points;

an ordering module for ordering the plurality of nodes for each of the plurality of ocean vessels in the historical data based on timestamps of respective data points for each ocean vessel corresponding to each node;

an edge generation module for generating a directed edge between a first node of the plurality of ordered nodes and a second node of the plurality of ordered nodes, when the historical data indicates that a given ocean vessel has transited from the first node to the second node based on the timestamp of the respective data point for the ocean vessel;

a refinement module for refining the route map by reducing the number of edges based on a threshold length determined using average distances from data points to their respective closest nodes; and a route determination module for:

determining a route for the ocean vessel based on the generated route map;

identifying an area of adverse weather associated with the route;

determining, based at least in part on one or more of a location of the area of adverse weather or a severity of the adverse weather, to update the route for the ocean vessel;

determining an updated route for the ocean vessel based on the generated route map and the area of adverse weather; and a control system configured to receive at least the determined updated route, and to autonomously navigate the ocean vessel along the determined updated route.

7. The system according to claim 6, wherein the refinement module refines the route map based on at least one of a density of the plurality of nodes and one or more obstacles.

8. The system according to claim 7, wherein the refinement module comprises a density analysis module for:

determining a first group of data points where the first node is the closest node;

determining a second group of data points where the second node is the closest node;

calculating a first average distance from each of the data points in the first group to the first node and a second average distance from each of the data points in the second group to the second node;

determining a threshold length of the directed edge based on the first average distance and second average distance calculated; and filtering the edges based on the threshold length.

9. The system according to claim 7, wherein the refinement module comprises an obstacle analysis module for:

obtaining geographical information representing at least one obstacle in a given area;

identifying whether one or more edges of the route map intersect the obstacle;

determining whether to delete one or more of the identified edges; and refining the route map based on the determination.

10. A non-transitory computer-readable storage medium, storing instructions that, when executed by a processor, cause the processor to determine a route for an ocean vessel, the instructions comprising:

generating a route map, wherein the generation of the route map comprises:

obtaining historical data for a plurality of ocean vessels from a storage, the historical data comprising a plurality of data points for each of the plurality of ocean vessels;

determining a plurality of nodes each to represent a subset of the data points of the historical data;

applying the historical data to the plurality of nodes by determining a closest node for each data point;

ordering the plurality of nodes for each of the plurality of ocean vessels in the historical data based on timestamps of respective data points for each ocean vessel corresponding to each node;

generating a directed edge between a first node of the plurality of ordered nodes and a second node of the plurality of ordered nodes, when the historical data indicates that a given ocean vessel has transited from the first node to the second node based on the timestamp of the respective data point for the ocean vessel;

refining the route map by reducing the number of edges based on a threshold length determined using average distances from data points to their respective closest nodes;

determining the route for the ocean vessel based on the generated route map;

outputting the determined route to a control system; and identifying an area of adverse weather associated with the route;

determining, based at least in part on one or more of a location of the area of adverse weather or a severity of the adverse weather, to update the route for the ocean vessel;

determining an updated route for the ocean vessel based on the generated route map and the area of adverse weather; and autonomously navigating the ocean vessel along the determined route by the control system.

* * * * *